United States Patent
Habara et al.

(10) Patent No.: US 9,850,824 B2
(45) Date of Patent: Dec. 26, 2017

(54) VALVE WORKING ANGLE VARIABLE SYSTEM

(75) Inventors: Shunsuke Habara, Toyota (JP);
Toyokazu Nakashima, Toyota (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 879 days.

(21) Appl. No.: 13/393,074

(22) PCT Filed: Jan. 15, 2010

(86) PCT No.: PCT/JP2010/050440
§ 371 (c)(1),
(2), (4) Date: Feb. 28, 2012

(87) PCT Pub. No.: WO2011/086693
PCT Pub. Date: Jul. 21, 2011

(65) Prior Publication Data
US 2012/0158267 A1  Jun. 21, 2012

(51) Int. Cl.
*F02D 13/02* (2006.01)
*F02D 11/10* (2006.01)
(Continued)

(52) U.S. Cl.
CPC ...... *F02D 13/0203* (2013.01); *F01L 13/0063* (2013.01); *F02D 11/107* (2013.01);
(Continued)

(58) Field of Classification Search
CPC ............ F02D 13/0253; F02D 41/2422; F02D 13/0203; F02D 41/0002; F02D 41/221;
(Continued)

(56) References Cited

U.S. PATENT DOCUMENTS 2,200,723 A * 5/1940 Reichhelm George L ............... F02D 9/02
48/189.4
4,531,198 A * 7/1985 Matsuda ............... F02P 11/00
714/23

(Continued)

FOREIGN PATENT DOCUMENTS

DE  102007034466 A1 *  1/2008 ............. G05B 23/02
FR      2912457 A1 *  8/2008 ................ F01L 9/04
(Continued)

OTHER PUBLICATIONS

Translation of the International Preliminary Report on Patentability for corresponding International Patent Application No. PCT/JP2010/050440 dated Aug. 7, 2012.

*Primary Examiner* — Sizo Vilakazi
*Assistant Examiner* — Brian Kirby
(74) *Attorney, Agent, or Firm* — Sughrue Mion, PLLC

(57) ABSTRACT

A drive circuit (203) of an actuator (2) calculates an actual working angle from an actual operation quantity with reference to a reference table used to calculate a target operation quantity, and transmits the actual working angle and the actual operation quantity to a command unit (4). The command unit (4) determines whether or not the received values of the actual working angle and the operation quantity correspond to the valve working angle and the operation quantity of the reference table stored in the command unit (4), to detect a discrepancy between the operation modes of the actuator (2) and the command unit (4).

10 Claims, 9 Drawing Sheets

(51) Int. Cl.
*F01L 13/00* (2006.01)
*F02D 41/00* (2006.01)
*F02D 41/22* (2006.01)
*F01L 1/18* (2006.01)
*F01L 1/24* (2006.01)
*F01L 1/46* (2006.01)
*F02D 41/28* (2006.01)

(52) U.S. Cl.
CPC ....... *F02D 41/0002* (2013.01); *F02D 41/221* (2013.01); *F01L 1/185* (2013.01); *F01L 1/2405* (2013.01); *F01L 1/462* (2013.01); *F01L 2105/00* (2013.01); *F01L 2800/14* (2013.01); *F01L 2820/032* (2013.01); *F02D 41/28* (2013.01); *F02D 2041/001* (2013.01); *Y02T 10/18* (2013.01); *Y02T 10/42* (2013.01)

(58) Field of Classification Search
CPC .... F02D 41/28; F02D 41/001; F01L 13/0063; F01L 1/2405; F01L 2105/00; F01L 2800/14; F01L 1/462; F01L 1/185; F01L 2820/032; F01L 2800/11; F01L 2800/12; Y02T 10/18; Y02T 10/42; G05B 23/0205; G05B 23/0237; G06F 11/1608
USPC ............. 701/101, 102, 103, 33.7, 34.2, 107; 123/90.11, 90.15–90.18, 321, 322, 123/345–348, 90.31; 714/11; 700/29
See application file for complete search history.

(56) References Cited

U.S. PATENT DOCUMENTS

| | | | | |
|---|---|---|---|---|
| 5,012,415 A * | 4/1991 | Boe | ...................... | A01B 63/112 172/3 |
| 5,563,788 A * | 10/1996 | Yoon | ................... | B60R 16/0231 701/114 |
| 5,719,559 A * | 2/1998 | Talbott | ................. | G05B 19/048 318/565 |
| 6,048,193 A * | 4/2000 | Juntunen | ................. | F23N 5/265 126/116 A |
| 6,522,964 B1 * | 2/2003 | Miki | ....................... | E02F 9/205 172/315 |
| 6,768,279 B1 * | 7/2004 | Skinner | ............... | H02P 23/0077 318/400.12 |
| 6,883,476 B1 * | 4/2005 | Nohara | ................... | F01L 1/022 123/90.15 |
| 7,131,051 B2 * | 10/2006 | Von Wendorff | ........ | B60T 8/885 714/774 |
| 7,178,493 B2 * | 2/2007 | Kang | ...................... | F02D 13/0253 123/90.1 |
| 7,302,314 B2 * | 11/2007 | Sommer | ............. | F02D 41/2432 701/1 |
| 7,367,918 B2 * | 5/2008 | Muetzel | .................. | F16H 61/30 477/33 |
| 7,424,641 B2 * | 9/2008 | Sundaram | ........... | G06F 11/1004 700/81 |
| 7,467,029 B2 * | 12/2008 | Forest | ................. | B60W 50/029 340/507 |
| 7,577,482 B1 * | 8/2009 | Steele | ................... | G05B 19/042 700/19 |
| 7,612,464 B2 * | 11/2009 | Yano | ..................... | F02D 11/107 307/10.1 |
| 7,933,696 B2 * | 4/2011 | Mayhew | .................. | G05B 9/02 701/34.3 |
| 7,969,109 B2 * | 6/2011 | Masuo | ..................... | B23Q 5/40 303/113.2 |
| 7,984,878 B2 * | 7/2011 | Hirvonen | ................ | B64C 13/42 244/194 |
| 8,042,503 B2 * | 10/2011 | Inoue | ........................ | F01L 1/34 123/90.15 |
| 8,205,584 B2 * | 6/2012 | Noda | ................... | F01L 13/0015 123/90.15 |
| 8,335,628 B2 * | 12/2012 | Yoo | ......................... | F01L 1/022 123/90.11 |
| 8,452,507 B2 * | 5/2013 | Poertzgen | .............. | B60T 8/885 188/158 |
| 8,527,159 B2 * | 9/2013 | Bezdek | ............... | F16H 61/0006 180/337 |
| 2002/0198683 A1 | 12/2002 | Yoshiki et al. | | |
| 2003/0033036 A1 * | 2/2003 | Wendorff | ........................ | 700/79 |
| 2005/0081808 A1 * | 4/2005 | Tani | ........................ | F01L 1/022 123/90.17 |
| 2005/0154522 A1 | 7/2005 | Fuwa et al. | | |
| 2006/0126256 A1 * | 6/2006 | Forest | ................. | B60W 50/029 361/139 |
| 2006/0229797 A1 | 10/2006 | Sawada et al. | | |
| 2007/0012803 A1 * | 1/2007 | Shimizu | ............... | F02M 61/162 239/497 |
| 2007/0192001 A1 * | 8/2007 | Tatsumi | ................ | B60W 50/04 701/30.7 |
| 2008/0059038 A1 * | 3/2008 | Yoshida | ............ | B60W 50/0205 701/99 |
| 2008/0071463 A1 * | 3/2008 | Tanaka | ..................... | F01L 1/352 701/102 |
| 2008/0221752 A1 * | 9/2008 | Jager | ..................... | B60W 50/045 701/33.4 |
| 2009/0048757 A1 * | 2/2009 | Chang | ................. | F02D 13/0207 701/102 |
| 2009/0088892 A1 * | 4/2009 | Shimizu | ............... | F01L 13/0026 700/213 |
| 2009/0101094 A1 * | 4/2009 | Mashiki | ................ | F01L 1/352 123/90.11 |
| 2009/0107431 A1 * | 4/2009 | Ezaki | ....................... | F01L 1/02 123/90.16 |
| 2009/0164077 A1 * | 6/2009 | Kiessner-Haiden | ............... | F16H 61/0202 701/67 |
| 2009/0194047 A1 * | 8/2009 | Mashiki | ..................... | F01L 1/34 123/90.15 |
| 2009/0288480 A1 | 11/2009 | Noda | | |
| 2010/0071644 A1 * | 3/2010 | Noda | ................... | F01L 13/0015 123/90.16 |
| 2010/0188098 A1 * | 7/2010 | Fink | ........................ | G01D 3/08 324/537 |
| 2011/0033835 A1 * | 2/2011 | Endo | ................... | G09B 19/0038 434/365 |
| 2011/0178696 A1 * | 7/2011 | Gelez | ........................ | F01L 9/04 701/105 |

FOREIGN PATENT DOCUMENTS

| | | | |
|---|---|---|---|
| FR | 2912457 A1 * | 8/2008 | ................ F01L 9/04 |
| JP | 7-332118 A | 12/1995 | |
| JP | H09207734 A * | 8/1997 | |
| JP | 2005-201117 A | 7/2005 | |
| JP | 2006-312943 A | 11/2006 | |
| JP | 2007-77917 A | 3/2007 | |
| JP | 2009197768 A | 9/2009 | |
| JP | 2009-299543 A | 12/2009 | |
| JP | 2012013024 A * | 1/2012 | |

* cited by examiner

VALVE WORKING ANGLE VARIABLE SYSTEM

CROSS REFERENCE TO RELATED APPLICATIONS

This application is a National Stage of International Application No. PCT/JP2010/050440, filed on Jan. 15, 2010, the contents of all of which are incorporated herein by reference in their entirety.

TECHNICAL FIELD

The present invention relates to a valve working angle variable system that is able to vary the valve working angle of an engine valve, and more particularly, to improvement of a control structure for resolving problems accompanying expansion of the versatility of an actuator of such a system.

BACKGROUND ART

In recent years, in internal combustion engines of vehicles or the like, an improvement in performance, such as fuel consumption and air exhaustion, has been achieved by varying the valve characteristics of an engine valve (intake and exhaust valves) according to engine operation status. A valve working angle variable mechanism for varying the valve working angle of an engine valve has been put into practical use as a system for varying a valve characteristic.

FIG. 12 illustrates an example of the above mentioned valve working angle variable system. The valve working angle variable system illustrated in FIG. 12 includes a valve working angle variable mechanism 1, and an actuator 2 that drives the valve working angle variable mechanism 1. The actuator 2 includes a motor 200, a conversion mechanism 201 that converts rotation of the motor 200 into linear motion, a rotational angle sensor 202 that detects a rotational angle of the motor 200, and a drive circuit 203 that drives the motor 200. In the valve working angle variable system, as a control shaft 3 is driven by the actuator 2 in an axial direction, the valve working angle variable mechanism 1 operates to thereby vary the valve working angle of an engine valve. The drive circuit 203 of the actuator 2 stores a reference table for an operation quantity of the actuator 2 (stroke of the control shaft 3) and the valve working angle as data.

The actuator 2 is controlled by a command unit 4 that performs various kinds of engine controls including valve working angle control. The command unit 4 calculates an optimum valve working angle according to engine operation status, and gives the drive circuit 203 of the actuator 2 a command.

When a command regarding a valve working angle (a working angle command value) is received from the command unit 4, the drive circuit 203 calculates an operation quantity for the actuator 2 from which the working angle command value can be obtained, as a target operation quantity by looking up the reference table. The drive circuit 203 sets the valve working angle according to the command by rotating the motor 200 so that the current operation quantity of the actuator 2 obtained based on the rotational angle of the motor 200 detected by the rotational angle sensor 202 coincides with the target operation quantity.

FIG. 13 illustrates a configuration for a valve train of an internal combustion engine to which the above valve working angle variable system is applied. As illustrated in FIG. 13, the valve working angle variable mechanism 1 is installed between a cam 6 disposed on a cam shaft 5 and an engine valve 10. The valve working angle variable mechanism 1 is oscillatably supported by a rocker shaft 7 arranged in parallel to the cam shaft 5, and includes an input arm 100 and a pair of output arms 101 arranged on both sides of the input arm 100. Inside the pipe-like rocker shaft 7, the control shaft 3 is slidably arranged in an axial direction.

A roller 102 that abuts on the cam 6 is rotatably mounted on a leading end of the input arm 100 of the valve working angle variable mechanism 1. The input arm 100 is pressed down by the cam 6, and at this time, the input arm 100 oscillates about an axis of the rocker shaft 7 together with the output arms 101.

A projection 103 is formed on an outer circumference of the input arm 100. A lost motion spring 104 is arranged in a compressed state between the projection 103 and a spring seat 8 formed in a cylinder head of the internal combustion engine. The valve working angle variable mechanism 1 is urged so that the roller 102 of the input arm 100 can be pressed against the cam 6 by the lost motion spring 104.

Further, roller rocker arms 9 are arranged below both output arms 101 of the valve working angle variable mechanism 1, respectively. Each of the roller rocker arms 9 is oscillatably supported by the cylinder head of the internal combustion engine through its base end, and abuts on an upper end of the engine valve 10 through its leading end. A roller 11 is rotatably mounted to each roller rocker arm 9. The roller 11 is pressed against a cam surface 105 of the leading end of the output arm 101, which is formed on the side facing the roller rocker arm 9, due to spring force of a valve spring 12 of the engine valve 10.

In this valve train, when the valve working angle variable mechanism 1 oscillates from the cam 6 being pressed down due to the rotation of the cam shaft 5, the cam surface 105 of the output arm 101 presses the roller 11, so that the roller rocker arm 9 oscillates. As the roller rocker arm 9 oscillates, the leading end of the roller rocker arm 9 presses the upper end of the engine valve 10, and as a result the engine valve 10 is driven to open or close. At this time, a contact point between the cam surface 105 of the output arm 101 and the roller 11 of the roller rocker arm 9 reciprocates along the cam surface 105 with the oscillation of the output arm 101. As the distance from the contact point between the cam surface 105 and the roller 11 to the rocker shaft 7 increases, the pressing-down amount of the roller rocker arm 9 by the cam surface 105 and hence the lift amount of the engine valve 10 increases.

In addition, in this valve train, by displacing the control shaft 3 inside the rocker shaft 7 in the axial direction, the relative positions of the leading end of the input arm 100 and the leading end of the output arm 101 in the oscillation direction of the valve working angle variable mechanism 1 can be changed. Due to the change in the relative positions of the leading ends of the input arm 100 and the output arm 101, a reciprocating range of the contact point between the cam surface 105 and the roller 11 changes with the oscillation of the valve working angle variable mechanism 1, and hence, the maximum lift amount and the valve working angle of the engine valve 10 can vary.

Specifically, as the distance between the leading end of the input arm 100 and the leading end of the output arm 101 in the oscillation direction of the valve working angle variable mechanism 1 decreases, the above reciprocating range of the contact point between the cam surface 105 and the roller 11 is displaced so as to be closer to the rocker shaft 7, and thus the maximum lift amount and the valve working angle of the engine valve 10 decrease. Further, as the distance between the leading end of the input arm 100 and the leading end of the output arm 101 in the oscillation direction of the valve working angle variable mechanism 1 increases, the above reciprocating range of the contact point is displaced in a direction in which it moves away from the rocker shaft 7, and so the maximum lift amount and the valve working angle of the engine valve 10 increase.

Next, the internal structure of the valve working angle variable mechanism 1 will be described with reference to FIGS. 14 and 15. As illustrated in FIG. 14, a slider 106 of a substantially cylindrical shape is arranged inside the input arm 100 and the output arms 101 of the valve working angle variable mechanism 1. The slider 106 is integrated with the control shaft 3 and is configured to be rotatable in the axial direction of the control shaft 3. On the outer circumference of the slider 106, an input gear 107 having a helical spline is fixed to a central portion thereof in a longitudinal direction of the slider 106, and output gears 108 having a helical spline are fixed to both sides thereof in the longitudinal direction, respectively.

As illustrated in FIG. 15, an internal toothed gear 109 of an annular shape having a helical spline is formed on the inner circumference of the input arm 100, and an internal toothed gear 110 of an annular shape having a helical spline is formed on the inner circumference of each of the output arms 101. The internal toothed gear 109 of the input arm 100 meshes with the input gear 107 of the slider 106 (FIG. 14), and the internal toothed gear 110 of each output arm 101 meshes with the output gear 108 of the slider 106 (FIG. 14). The helical splines of the input gear 107 and the internal toothed gear 109 differ in an inclined angle from the helical splines of the output gear 108 and the internal toothed gear 110, and are opposite in an inclined direction to the helical splines of the output gear 108 and the internal toothed gear 110.

In this valve train, when the slider 106 is displaced in a co-axial direction with the movement of the control shaft 3 in the axial direction, the input gear 107 meshes with the internal toothed gear 109 and the output gear 108 meshes with the internal toothed gear 110, and so the relative positions of the leading end of the input arm 100 and the leading ends of both output arms 101 in the oscillation direction of the valve working angle variable mechanism 1 change. Specifically, as the slider 106 is displaced in a direction of an arrow L of FIG. 14, the relative positions of the leading end of the input arm 100 and the leading ends of both output arms 101 in the oscillation direction change such that the distance between the leading end of the input arm 100 and the leading ends of both output arms 101 decreases. On the other hand, as the slider 106 is displaced in a direction of an arrow H of FIG. 14, the relative positions change such that the distance between the leading end of the input arm 100 and the leading ends of both output arms 101 increases. Through the change in the relative position, the maximum lift amount and the valve working angle of the engine valve 10 according to the oscillation of the valve working angle variable mechanism 1 with the rotation of the cam 6 can be varied.

The above described valve working angle variable system is an example, and various types of the valve working angle variable systems have been suggested. For example, systems that vary a valve working angle by rotating a control shaft through an actuator and so driving a valve working angle variable mechanism have been suggested.

Conventionally, an internal combustion engine including a valve working angle variable system is disclosed in Patent Document 1. The internal combustion engine disclosed in Patent Document 1 includes a valve timing variable system that varies valve timing in addition to a valve working angle variable system. In the internal combustion engine including the two variable systems, when a valve working angle increases in a state in which valve timing is controlled near a piston top dead point, interference between the engine valve and the piston, so-called valve stamping may occur. Thus, in the system disclosed in Patent Document 1, by limiting a control range of a valve working angle according to current valve timing or by limiting a control range of valve timing according to a current valve working angle, the occurrence of valve stamping is avoided.

PRIOR ART DOCUMENT

Patent Document

Patent Document 1: Japanese Laid-Open Patent Publication No. 2006-312943

SUMMARY OF THE INVENTION

Problems that the Invention is to Solve

In recent years, as the kinds of vehicles employing the valve working angle variable system have increased, a number of valve working angle variable systems of different specifications have been developed. Since the variable range for the necessary valve working angle differs according to the specification of a vehicle model to which the valve working angle variable system is applied, it is necessary to change the specification of the valve working angle variable system according to the applicable vehicle model. In this case, when different actuators are employed in different valve working angle variable systems, the number of parts for the actuator increases, and there is a problem in terms of productivity. Thus, in order to reduce the production costs, a single actuator needs to be configured to support a number of types of valve working angle variable systems.

An actuator capable of supporting valve working angle variable systems of different specifications can be implemented by changing an actuator configuration as follows. As described above, the drive circuit 203 of the actuator 2 stores the reference table of the operation quantity and the valve working angle in its read only memory (ROM). At this time, when a specification of the valve working angle variable system is changed, a relationship between the operation quantity of the actuator 2 and the valve working angle changes. Thus, by configuring the actuator such that a plurality of reference tables respectively corresponding to applicable valve working angle variable systems are stored in the ROM of the drive circuit 203, a plurality of operation modes that differ in the reference table used for an operation of the actuator 2 are set, and the operation mode of the actuator 2 is changed in response to a command from the command unit 4, a plurality of valve working angle variable systems of different specifications can be supported by the single actuator 2.

For example, a case is assumed where a valve working angle variable system is applied to a vehicle model B that is newly developed as well as to an existing vehicle model A. In this case, when a reference table corresponding to the specification for a valve working angle variable system of the vehicle model A and a reference table corresponding to the specification of a valve working angle variable system of the vehicle model B are stored in the ROM of the drive circuit 203, the actuator 2 can support both the vehicle model A and the vehicle model B. That is, when the drive circuit 203 is configured to calculate that a target operation quantity of the vehicle model A using the reference table for the vehicle model A and to calculate a target operation quantity of the vehicle model B using the reference table for the vehicle model B, it is possible to appropriately control the valve working angle in both of the vehicles.

Standardization for the actuator is certainly effective in terms of reduction in the production costs. However, the following problems may occur. That is, when the actuator is standardized, a problem may occur in that the actuator malfunctions in an operation mode in which an applied valve working angle variable system is not supported.

For example, a case is assumed where an old-style actuator 2 that supports only a vehicle model A is erroneously mounted to a valve characteristic variable system of a vehicle mode B that is not supported by the actuator 2. In this case, when a command pertaining to a valve working angle is received from the command unit 4, the drive circuit 203 of the actuator 2 calculates a target operation quantity with reference to a reference table of the vehicle model A. Since the valve working angle variable system of the vehicle model A and the valve working angle variable system of the vehicle model B differ in the relationship between the operation quantity of the actuator 2 and the valve working angle, the valve working angle commanded by the command unit 4 is not obtained using the target operation quantity that the drive circuit 203 calculated with reference to the reference table for the vehicle model A. Thus, in this case, it is difficult to control the valve working angle according to the command from the command unit 4.

In addition, even when the actuator 2 is appropriately mounted, the drive circuit 203 may erroneously recognize the operation mode commanded by the command unit 4 due to communication abnormality, a failure of the drive circuit 203, or a phenomenon where ROM/RAM data is garbled. Further, the drive circuit 203 may operate in a state in which the operation mode commanded by the command unit 4 is not confirmed due to communication abnormality, a failure of the drive circuit 203, instantaneous interruption, or a phenomenon where ROM/RAM data is garbled. In these cases, the actuator 2 operates in an operation mode different from that commanded by the command unit 4.

As described above, when the single actuator 2 supports a number of types of valve working angle variable systems, a malfunction of the actuator 2 may occur due to a discrepancy in the operation mode between the command unit 4 and the actuator 2. When a malfunction of the actuator 2 occurs, the valve working angle is not controlled according to the command from the command unit 4. Thus, even though the control range of the valve working angle or the valve timing is limited as in Patent Document 1, valve stamping may occur.

It is an objective of the present invention to provide a control device for a valve working angle variable system capable of coping with a malfunction in an actuator caused due to a discrepancy in an operation mode between a command unit and an actuator, which may occur when an actuator is configured to support a plurality of systems of different specifications.

Means for Solving the Problems

To achieve the foregoing objective and in accordance with one aspect of the present invention, a valve working angle variable system includes an actuator is provided. The actuator calculates an operation quantity necessary for achieving a valve working angle commanded by a command unit based on a relationship between a valve working angle and an operation quantity stored in the actuator, and performs an operation. The command unit gives the actuator a command for an operation mode, and stores a relationship between the valve working angle and a parameter correlated to this valve working angle for the commanded operation mode. The actuator transmits values of the valve working angle and the parameter recognized by the actuator to the command unit, and the command unit determines whether or not the transmitted two values satisfy the relationship between the two values stored in the command unit. When a negative result is derived from the determination, at least one of notification of abnormality and stopping operation of the actuator is performed.

In the valve working angle variable system of the present invention, when a command on a valve working angle to set (a working angle command value) is received from the command unit, the actuator calculates an operation quantity from which the commanded valve working angle is achieved (a target operation quantity) based on the relationship between the valve working angle and the operation quantity of the actuator stored in the actuator. Then, the actuator adjusts the valve working angle according to the command by adjusting the actual operation quantity according to the calculated result.

When the actuator of the valve working variable system is configured to support a plurality of valve working angle variable systems of different specifications, a plurality of operation modes which differ in the relationship between the operation quantity of the actuator and the valve working angle are set. In this case, there may be a discrepancy between the operation mode assumed by the command unit and the operation mode actually used by the actuator. In this case, the actuator malfunctions, and thus the valve working angle is not controlled according to the command from the command unit.

In this regard, in the valve working angle variable system of the present invention, the command unit stores the relationship between the valve working angle and the parameter correlated to this valve working angle for the operation mode commanded of the actuator. When the relationship between the values changes according to the operation mode, the operation mode can be specified based on the relationship. In this case, when the actuator operates in the operation mode commanded by the command unit, the relationship between the valve working angle and the above parameter recognized by the actuator satisfies the relationship between the two values for the operation mode commanded by the command unit. Thus, when the relationship between the valve working angle and the above parameter recognized by the actuator does not follow the relationship between the two values stored in the command unit, it is determined that the actuator does not operate in the operation mode commanded by the command unit.

In this regard, in the above configuration, the actuator transmits the values for the valve working angle and the parameter recognized by the actuator to the command unit, and the command unit determines whether or not the transmitted two values satisfy the relationship between the two values stored in the command unit. Through this determination, it is possible to check if the actuator is not operating in the operation mode commanded by the command unit. When the discrepancy between the operation mode of the command unit and the operation mode of the actuator is detected, for example, the driver is notified of an abnormality by turning a malfunction indicator lamp (MIL) on, and/or operation of the actuator is stopped. Thus, according to the valve working angle variable system of the present invention it is possible to cope with a malfunction of the actuator which is caused by the discrepancy between the operation mode of the command unit and the operation mode of the actuator, which may occur when the actuator is configured to support a plurality of systems of different specifications.

Further, in the valve working angle variable system, the following parameters may be employed as the "parameter correlated to the valve working angle". That is, an employable parameter needs to change according to the valve working angle and be unambiguously decided according to the valve working angle. Further, when the relationship between the valve working angle and the operation quantity of the actuator changes, the relationship between the parameter and the valve working angle needs to change. Concrete examples of the parameter include an operation quantity for the actuator and the change speed upper limit value for the valve working angle.

In addition, the command unit can perform the determination in each of the valve working angle variable systems may be performed calculating one of the value of the valve working angle and the value of the parameter received from the actuator using the other of the values based on the relationship between the two values stored in the command unit, and checking whether or not the calculated value matches with the received value.

To achieve the foregoing objective, another aspect of the present invention provides a valve working angle variable system that includes an actuator is provided. The actuator calculates an operation quantity necessary for achieving a valve working angle commanded by a command unit based on a relationship between valve working angle and an operation quantity stored in the actuator, and performs an operation. The command unit gives the actuator a command for an operation mode, and stores a relationship between the valve working angle and the operation quantity for the commanded operation mode. The actuator calculates a value of the valve working angle using a value of the operation quantity based on the relationship stored in the actuator, and transmits the value of the operation quantity used for the calculation and the calculated value of the valve working angle to the command unit. The command unit determines whether or not the values of the valve working angle and the operation quantity received from the actuator satisfy the relationship between the two values stored in the command unit. When a negative result is derived from the determination, at least one of notification of abnormality and stopping operation of the actuator is performed.

In the above configuration, the actuator calculates the value of the valve working angle using the value of the operation quantity based on the relationship between the two values used for a calculation of the operation quantity using the commanded valve working angle. The command unit also stores the relationship between the valve working angle and the operation quantity for the operation mode commanded of the actuator. The relationship between the values differs according to the operation mode. For this reason, when the actuator does not operate in the operation mode commanded by the command unit, the relationship between the value of the operation quantity calculated by the actuator based on the relationship between the two values for the operation mode which is in use and the value of the valve working angle used for the calculation does not follow the relationship between the two values stored in the command unit. Thus, in the above configuration, it is possible to check that the actuator is not operating in the operation mode commanded by the command unit through the determination performed by the command unit. When the discrepancy between the operation mode of the command unit and the operation mode of the actuator is detected, abnormality is notified to the driver, and/or an operation of the actuator is stopped. Thus, according to the above configuration, it is possible to cope with a malfunction of the actuator which is caused by the discrepancy between the operation mode of the command unit and the operation mode of the actuator, which may occur when the actuator is configured to support a plurality of systems of different specifications.

Further, even when the operation modes are different, there may be little difference in the operation quantity of the actuator from which the valve working angle is achieved, depending on the value of the valve working angle. In this case, it is difficult to detect the discrepancy between the operation mode of the command unit and the operation mode of the actuator based on only the relationship between the valve working angle and the operation quantity until the valve working angle changes.

Since the relationship between the operation quantity of the actuator and the valve working angle is not linear, the change speed of the valve working angle changes according to the value of the valve working angle even though an operation speed of the actuator is constant. When the relationship between the operation quantity of the actuator and the valve working angle changes, the relationship between the valve working angle and the change speed upper limit value of the valve working angle changes. Thus, it is possible to detect the discrepancy between the operation mode of the command unit and the operation mode of the actuator even based on the relationship between the valve working angle and the change speed upper limit value thereof.

For this reason, in the valve working angle variable system having the above configuration, the command unit stores a relationship between the valve working angle and a change speed upper limit value of this valve working angle for an operation mode commanded of the actuator, the actuator stores a relationship between the valve working angle and the change speed upper limit value for an operation mode used by the actuator, the actuator calculates the change speed upper limit value using the value of the valve working angle based on the relationship between the two values stored in the actuator, and transmits the two values to the command unit, and the command unit determines whether or not the value of the valve working angle and the change speed upper limit value received from the actuator satisfy the relationship between the two values stored in the command unit. Thus, it is possible to determine whether or not the actuator is operating in the appropriate operation mode as commanded, by double check including the determination based on the relationship between the valve working angle and the operation quantity of the actuator and the determination based on the relationship between the valve working angle and the change speed upper limit value thereof. In addition, a valve working angle region where the discrepancy between the operation modes can be detected increases, and thus the discrepancy between the operation modes can be detected more rapidly and accurately.

Further, to achieve the foregoing objective, another aspect of the present invention provides a valve working angle variable system that includes an actuator is provided. The actuator calculates an operation quantity necessary for achieving a valve working angle commanded by a command unit based on a relationship between a valve working angle and an operation quantity stored in the actuator, and performs an operation. The command unit gives the actuator a command for an operation mode. The actuator transmits an operation mode set according to the command to the command unit. The command unit determines whether or not the operation mode received from the actuator matches with the operation mode commanded of this actuator. When a negative result is derived from the determination, at least one of notification of abnormality and stopping operation of the actuator is performed.

In the above configuration, the actuator transmits the operation mode set according to the command from the command unit to the command unit. The command unit determines whether or not the operation mode received from the actuator matches with the operation mode commanded of this actuator. For this reason, in the above configuration, through the determination, it is possible to check that the actuator is not operating in the operation mode commanded by the command unit. When the discrepancy between the operation mode of the command unit and the operation mode of the actuator is detected, abnormality is notified to the driver, and/or an operation of the actuator is stopped. Thus, according to the above configuration, it is possible to cope with a malfunction of the actuator which is caused by the discrepancy between the operation mode of the command unit and the operation mode of the actuator, which may occur when the actuator is configured to support a plurality of systems of different specifications.

DETAILED DESCRIPTION OF THE PREFERRED EMBODIMENTS

First Embodiment

Figure 1:
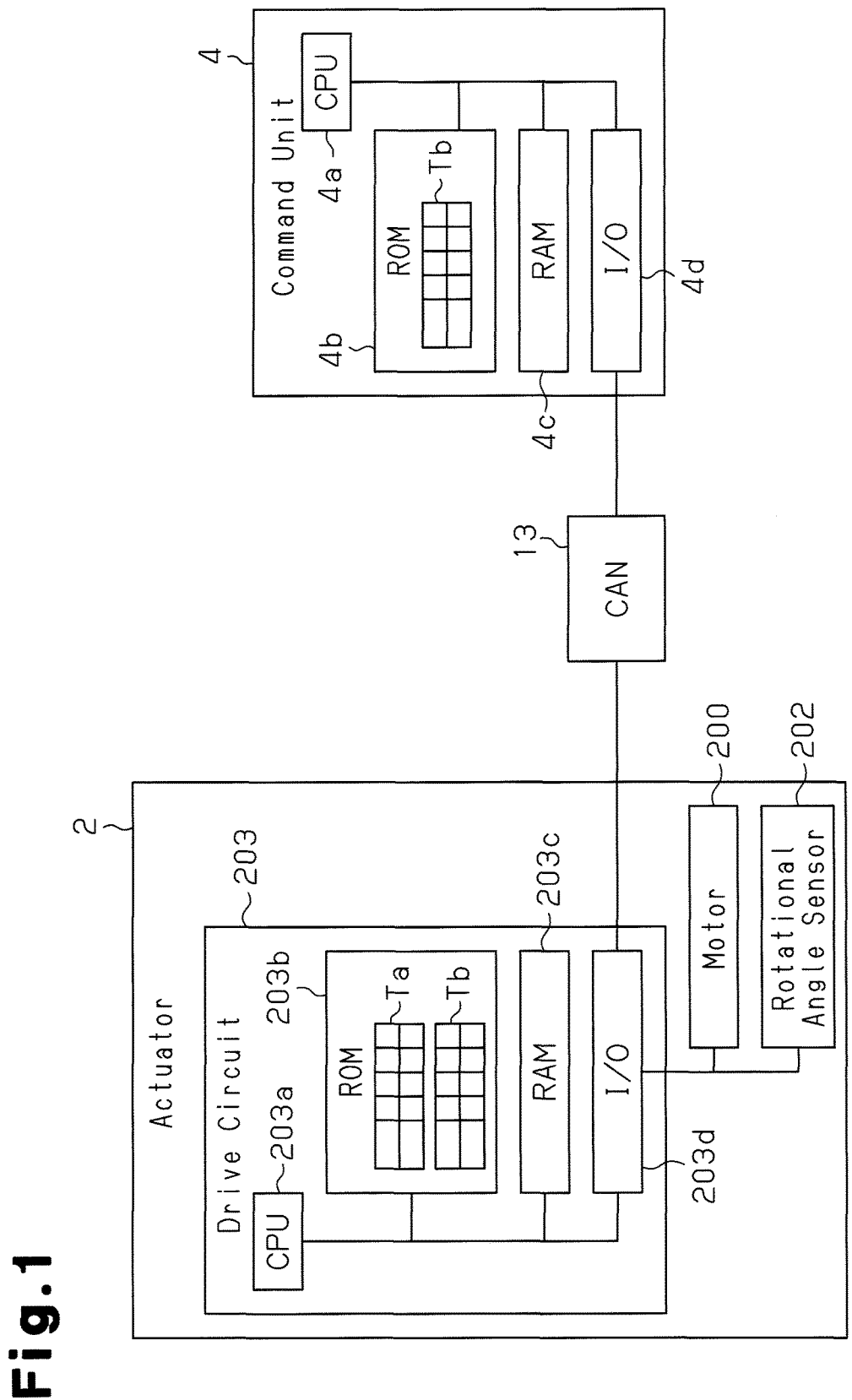
FIG. 1 is a block diagram schematically illustrating a configuration of a control system of a valve working angle variable system according to a first embodiment of the present invention.

Hereinafter, a first embodiment in which a valve working angle variable system of the present invention is implemented will be described with reference to FIGS. 1 to 3. Hardware configurations for a valve working angle variable system and a valve working angle variable mechanism thereof according to the present embodiment are the same as in the conventional system illustrated in FIGS. 12 to 15, and thus a detailed description thereof will be omitted.

As described above, the reference table of the operation quantity of the actuator 2 (stroke of the control shaft 3) and the valve working angle is stored in the drive circuit 203 of the actuator 2 of the valve working angle variable system. When a command for the valve working angle is received from the command unit 4, the drive circuit 203 calculates the operation quantity for the actuator 2, from which the commanded valve working angle is achieved, as the target operation quantity with reference to the reference table. The drive circuit 203 adjusts the valve working angle in response to the command by rotating the motor 200 so that the calculated target operation quantity can be achieved.

In the present embodiment, a valve working angle variable system is applied to a vehicle model B which is newly developed as well as an existing vehicle model A. It is assumed that a valve working angle variable system of the vehicle model A and a valve working angle variable system of the vehicle model B differ in specification and the variable range for the valve working angle.

FIG. 1 illustrates a configuration of a control system of the valve working angle variable system of the vehicle model B. As illustrated in FIG. 1, the control system of the valve working angle variable system includes a command unit 4 for engine control and a drive circuit 203 for actuator driving.

The command unit 4 includes a CPU 4a that executes various calculation processes related to engine control, a ROM 4b that stores a program or data for engine control, a RAM 4c that temporarily stores a calculation result of the CPU, a detection result of a sensor, and the like, and an I/O 4d that performs reception of a signal from the outside and transmission of a signal to the outside. The I/O 4d of the command unit 4 is connected to a controller area network (CAN) 13.

The drive circuit 203 of the actuator 2 includes a CPU 203a that executes a calculation process necessary for driving the actuator 2, a ROM 203b that stores a program or data, a RAM 203c that temporarily stores a calculation result of the CPU, a detection result of a sensor, and the like, and an I/O 203d that performs reception of a signal from the outside and transmission of a signal to the outside. A motor 200 and a rotational angle sensor 202 that detects a rotational angle of the motor 200 are connected to the I/O 203*d* of the drive circuit 203. Further, the I/O 203*d* of the drive circuit 203 is connected to the I/O 4*d* of the command unit 4 via the CAN 13.

The actuator 2 applied to the valve working angle variable system of the vehicle model B is configured to be applicable to the valve working angle variable system of the vehicle model A. For this reason, two reference tables of the valve working angle and the operation quantity (the stroke of the control shaft 3) are stored in the ROM 203*b* of the drive circuit 203 of the actuator 2. That is, the ROM 203*b* stores a reference table Ta corresponding to the specification of the valve working angle variable system of the vehicle model A and a reference table Tb corresponding to the specification of the valve working angle variable system of the vehicle model B. As described above, the actuator 2 stores the relationship of the valve working angle and the operation quantity for each of the applicable valve working angle variable systems.

In the valve working angle variable system of the present embodiment, the ROM 4*b* of the command unit 4 also stores the reference table Tb of the valve working angle and the operation quantity corresponding to the specification of the valve working angle variable system of the vehicle model B. That is, the command unit 4 stores the relationship between the valve working angle and the operation quantity for the valve working angle variable system to which the command unit 4 is applied.

Figure 2:
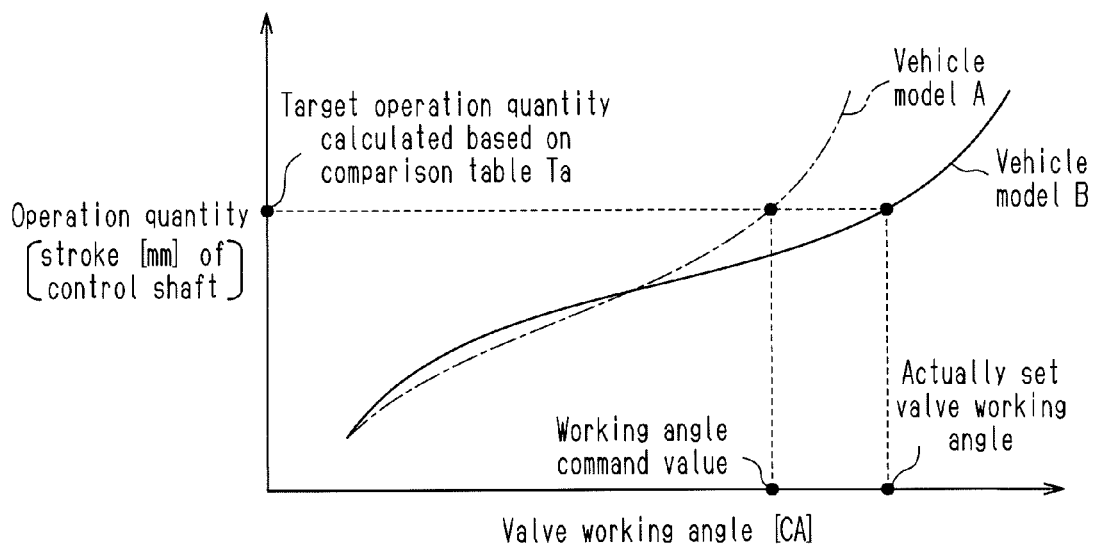
FIG. 2 is a graph illustrating relationships between a valve working angle and an operation quantity in reference tables Ta and Tb used in the first embodiment.

FIG. 2 illustrates relationships between the valve working angle and the operation quantity (the stroke of the control shaft 3) in the reference tables Ta and Tb. In the graph illustrated in FIG. 2, the relationship of the reference table Ta corresponding to the valve working angle variable system of the vehicle model A is indicated by an alternate long and short dash line, and the relationship of the reference table Tb corresponding to the valve working angle variable system of the vehicle model B is indicated by a solid line. As illustrated in FIG. 2, the valve working angle variable system of the vehicle model B is larger in an upper limit of the variable range of the valve working angle than the valve working angle variable system of the vehicle model A.

In the valve working angle variable system having the above configuration, the command unit 4 calculates an optimum valve working angle according to an engine operation status, and gives a command on the calculated valve working angle to the drive circuit 203 of the actuator 2 as a working angle command value. Further, at this time, the command unit 4 gives a command on the operation mode to select to the actuator 2 together. At this time, in the case of the valve working angle variable system of the vehicle model B, the command unit 4 gives a command for an operation mode corresponding to the valve working angle variable system of the vehicle model B (hereinafter, referred to as an "operation mode B") as the operation mode to select.

The drive circuit 203 that has received the commands calculates the operation quantity of the actuator 2 from which the commanded valve working angle is achieved, that is, the target operation quantity, with reference to the reference table Tb corresponding to the commanded operation mode B. The drive circuit 203 achieves the commanded valve working angle by rotating the motor 200 so that a current value of the operation quantity (an actual operation quantity) obtained from the detection result of the rotational angle sensor 202 can match with a value of the target operation quantity.

Further, the drive circuit 203 obtains the actual operation quantity based on the detection value of the rotational angle sensor 202, and obtains the current value of the valve working angle (the actual working angle) based on the actual operation quantity with reference to the reference table Tb corresponding to the commanded operation mode B. Then, the drive circuit 203 transmits the actual working angle and the actual operation quantity which have been obtained in the above described way to the command unit 4. The transmission of the actual working angle and the actual operation quantity is performed even in the conventional system in which the valve working angle variable system is employed only for the vehicle model A, for detection, diagnosis, or the like of the actual working angle for various controls.

When the valve working angle variable system is employed only in the vehicle model A, since the actuator 2 has one operation mode, the command unit 4 of the valve working angle variable system of the vehicle model A was configured not to give a command on the operation mode to the actuator 2. Thus, the drive circuit 203 of the actuator 2 that supports both of the vehicle models A and B is configured to operate in the operation mode corresponding to the valve working angle variable system of the vehicle model A (hereinafter, referred to as an "operation mode A") when no command on the operation mode is given from the command unit 4.

As described above, when a plurality of valve working angle variable systems of different specifications are supported, the actuator 2 may possibly malfunction in the following three cases.

(Case 1) When Actuator is Erroneously Mounted

A firstly considered case is a case in which the old-style actuator 2 that supports only the vehicle model A is erroneously mounted to the valve working angle variable system of the vehicle model B. The old-style actuator 2 that supports only the vehicle model A has only the reference table Ta corresponding to the valve working angle variable system of the vehicle model A, and does not receive a command on the operation mode from the command unit 4. For this reason, at this time, the actuator 2 operates using the reference table Ta of the vehicle mode A.

(Case 2) When Command on Operation Mode is Erroneously Recognized

Even when the appropriate actuator 2 is mounted, the drive circuit 203 may erroneously recognize the operation mode commanded from the command unit 4 due to communication abnormality, a failure of the drive circuit 203, or a phenomenon where ROM/RAM data is garbled. For example, even though the command unit 4 commands the operation mode for the vehicle mode B, if the drive circuit 203 erroneously recognizes that the operation mode for the vehicle mode A is commanded, the actuator 2 will operate using the reference table Ta for the vehicle model A.

(Case 3) When it is Difficult to Check Commanded Operation Mode

Even when the appropriate actuator 2 is mounted, due to communication abnormality, a failure of the drive circuit 203, instantaneous interruption, or a phenomenon where ROM/RAM data is garbled, a command for the operation mode from the command unit 4 may not reach the drive circuit 203, or data in the drive circuit 203 may be cleared even though the command reaches the drive circuit 203. In this case, the drive circuit 203 recognizes that there was no command for the operation mode. As described above, when there is no command on the operation mode, the drive circuit 203 of the actuator 2 operates in the operation mode for the vehicle model A. Thus, in this case, the actuator 2 operates using the reference table Ta for the vehicle model A.

As described above, when the actuator 2 is configured to support the valve working angle variable systems of both of the vehicle models A and B, the actuator 2 in the valve working angle variable system of the vehicle model B may possibly malfunction in the operation mode A. As illustrated in FIG. 2 together, when the drive circuit 203 calculates the target operation quantity according to the relationship between the valve working angle and the operation quantity for the operation mode A, an actually set valve working angle may increase to be larger than a value commanded by the command unit 4. For this reason, in this case, even though the command unit 4 commands the valve working angle within a range in which valve stamping is avoidable, the valve working angle excessively increases, so that valve stamping may occur.

In this regard, in the present embodiment, the command unit 4 is configured to determine whether or not the actual operation quantity and the actual working angle received from the drive circuit 203 of the actuator 2 satisfy the relationship between the valve working angle and the operation quantity of the reference table Tb stored in the command unit 4. More specifically, the command unit 4 is configured to calculate a value for the valve working angle corresponding to a value of the actual operation quantity received from the drive circuit 203 based on the value of the actual operation quantity, with reference to the reference table Tb stored in the command unit 4. Then, the command unit 4 compares the actual working angle received from the drive circuit 203 with the value of the valve working angle calculated by the command unit 4, and determines whether or not the two values match with each other.

When the reference table that the drive circuit 203 has used to calculate the actual working angle is the same as the reference table that the command unit 4 has used to calculate the valve working angle, the two values match with each other. Thus, when the value of the actual working angle transmitted from the drive circuit 203 is different from the value of the valve working angle calculated by the command unit 4, it is recognized that the two values have been calculated using different reference tables, that is, it is recognized that the drive circuit 203 has used the reference table different from that commanded by the command unit 4. Thus, when a negative result is derived from the above determination, it can be determined that there is a discrepancy between the operation mode of the command unit 4 and the operation mode of the actuator 2. That is, the malfunction of the actuator 2 in the above three cases can be detected.

Figure 3:
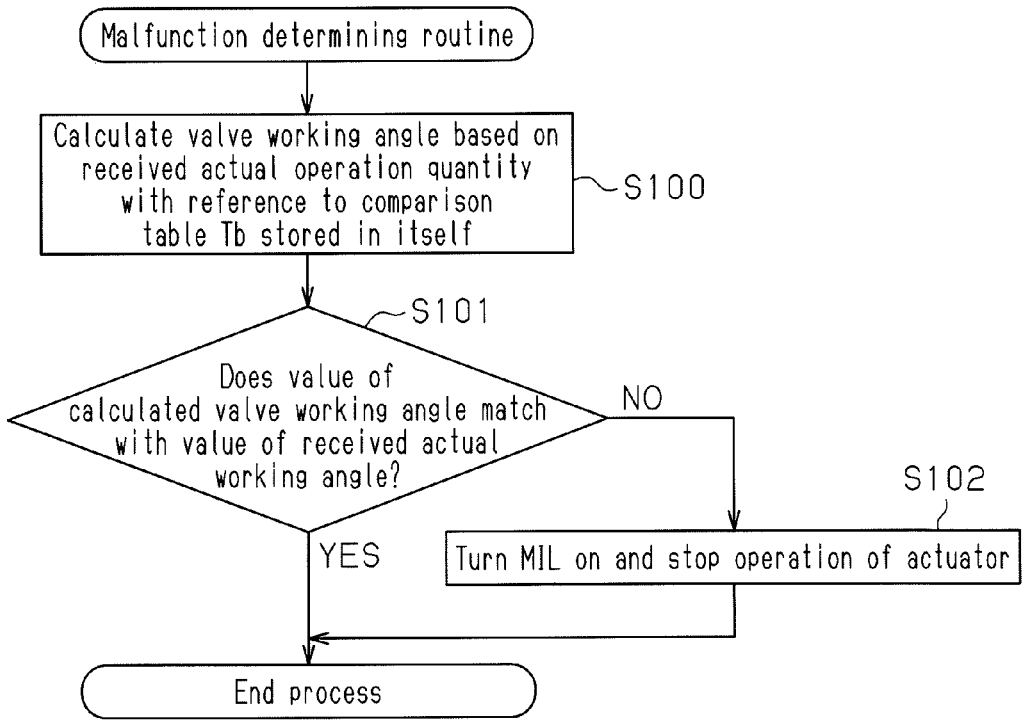
FIG. 3 is a flowchart of a malfunction determining routine employed in the first embodiment.

FIG. 3 illustrates a process procedure for the command unit 4 in a malfunction determining routine for the above described determination. The process of the present routine is repetitively executed by the command unit 4 each time the actual operation quantity and the actual working angle are received from the drive circuit 203.

When the present routine starts, in step S100, the command unit 4 calculates a value for a valve working angle corresponding to an actual operation quantity received from the drive circuit 203 based on the actual operation quantity, with reference to the reference table Tb stored in the command unit 4. Subsequently, in step S101, the command unit 4 determines whether or not the calculated value of the valve working angle matches with the value of the actual working angle received from the drive circuit 203. When it is determined that the two values match with each other (YES in step S101), the command unit 4 finishes the process of the present routine of this time. However, when it is determined that the two values do not match with each other (NO in step S101), in step S102, the command unit 4 turns an MIL on so as to notify the driver of abnormality and stops an operation of the actuator 2 by power shutdown.

In the present embodiment described above, the operation quantity of the actuator 2 corresponds to the parameter correlated to the valve working angle. Further, in the present embodiment, the relationship between the valve working angle and the operation quantity is stored in the command unit 4 and the drive circuit 203 as the reference tables Ta and Tb.

According to the above described present embodiment, the following advantages are obtained.

(1) In the present embodiment, the drive circuit 203 of the actuator 2 transmits the valve working angle and the operation quantity recognized by the drive circuit 203 to the command unit 4, and the command unit 4 determines whether or not the received two values satisfy the relationship between the two values in the reference table Tb stored in the command unit 4. More specifically, the drive circuit 203 calculates the actual working angle based on the actual operation quantity by using the reference table used to calculate the target operation quantity based on the working angle command value, and transmits the values to the command unit 4. Then, the command unit 4 calculates the value of the valve working angle corresponding to the actual operation quantity received from the drive circuit 203 based on the actual operation quantity with reference to the reference table Tb stored in the command unit 4, and determines whether or not the value of the valve working angle matches with the calculated value of the actual working angle received from the drive circuit 203. Through this determination, it is possible to check that the actuator 2 is not operating in the operation mode commanded by the command unit 4. Thus, according to the valve working angle variable system of the present embodiment, it is possible to cope with a malfunction of the actuator 2 which is caused by a discrepancy between the operation mode of the command unit 4 and the operation mode of the actuator 2, which may occur when the actuator 2 is configured to support a plurality of systems of different specifications.

(2) In the present embodiment, the command unit 4 determines a malfunction of the actuator 2 using the values of the actual operation quantity and the actual working angle, which are transmitted from the actuator 2 to the command unit 4 even in the conventional system. Thus, the discrepancy between the operation mode of the actuator 2 and the operation mode of the command unit 4 can be detected without substantially changing the communication scheme between the actuator 2 and the command unit 4.

Second Embodiment

Next, a second embodiment in which a valve working angle variable system of the present invention is implemented will be described with reference to FIGS. 4 to 6 focusing on the differences from the above embodiment.

In the above embodiment, the discrepancy between the operation mode of the actuator 2 and the operation mode of the command unit 4 is detected based on the relationship between the operation quantity of the actuator 2 and the valve working angle. However, there is a region where there is no substantial difference between the value of the operation quantity of the reference table Ta and the value of the operation quantity of the reference table Tb, depending on the value of the valve working angle, as illustrated in FIG.

4. For this reason, it is difficult to detect the discrepancy in the operation mode in the region based on only the relationship between the operation quantity and the valve working angle, and thus the malfunction detection may be delayed.

The operation speed of the actuator 2 (the change speed of the operation quantity) has an upper limit due to the limitation in the revolution speed of the motor 200. In addition, the change speed of the settable valve working angle also has an upper limit due to a limitation in the operation speed. Meanwhile, since the relationship between the operation quantity and the valve working angle is not linear, a relationship between the change amount of the operation quantity and the change amount of the valve working angle changes according to the valve working angle. Thus, a change speed upper limit value of the valve working angle is a parameter that changes according to the valve working angle, similarly to the operation quantity, and is unambiguously determined according to the valve working angle. Further, the change speed upper limit value of the valve working angle is a parameter in which the relationship between the valve working angle and the operation quantity of the actuator 2 changes. Thus, a relationship between the change speed upper limit value of the valve working angle and the valve working angle can be used for the determination on the discrepancy between the operation mode of the actuator 2 and the operation mode of the command unit 4.

Figure 4:
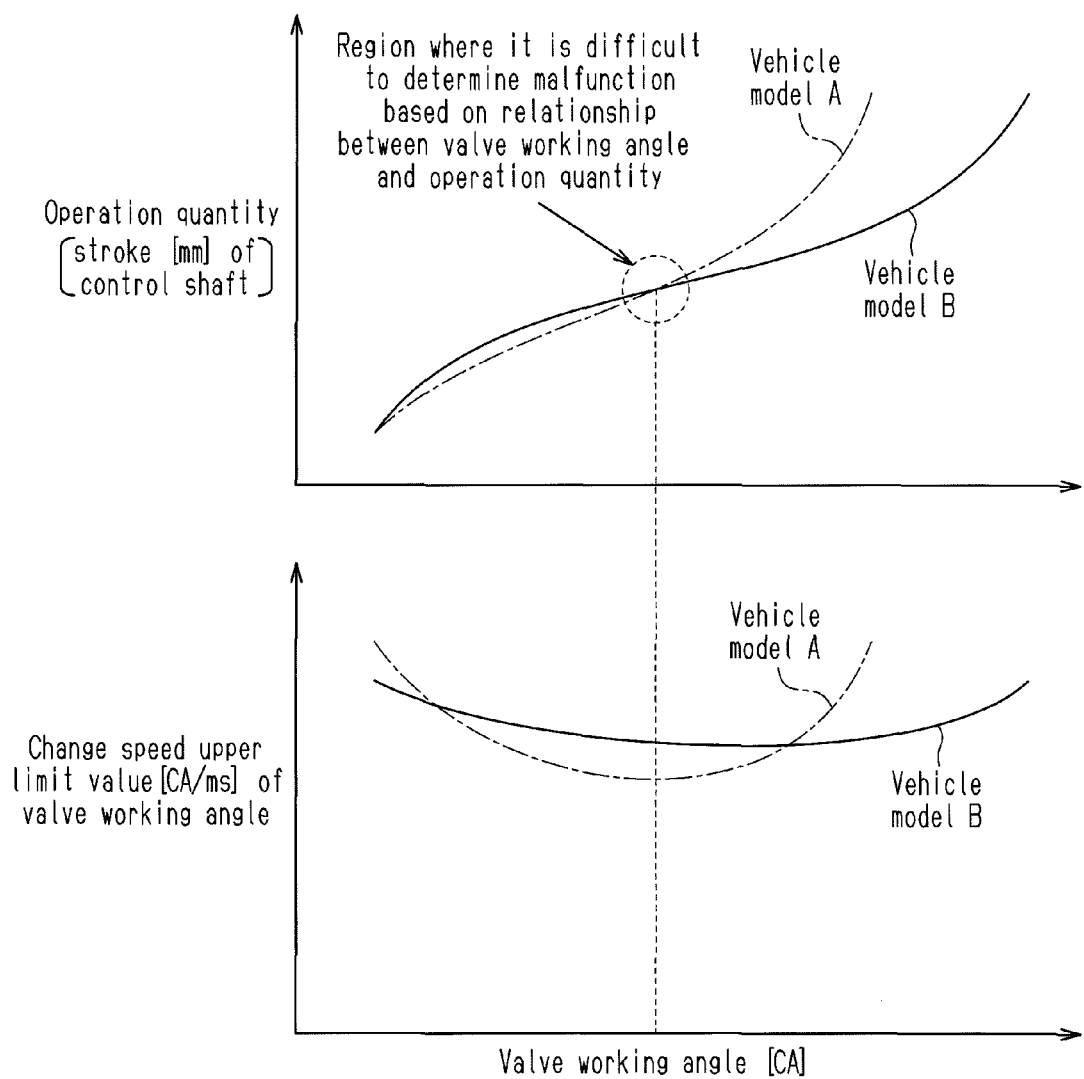
FIG. 4 are graphs illustrating a relationship between a valve working angle and an operation quantity and a relationship between a valve working angle and a change speed upper limit value in valve working angle variable mechanisms of vehicle modes A and B.

In FIG. 4, the relationships between the valve working angle and the change speed upper limit value of the valve working angle for the operation modes A and B of the actuator 2 are illustrated together. As illustrated in FIG. 4, the relationship between the valve working angle and the change speed upper limit value of the valve working angle differs depending on the operation mode of the actuator 2. Further, as illustrated in FIG. 4, there is a region where there is little difference in the change speed upper limit value between the two operation modes A and B. A valve working angle region where there is little difference in the change speed upper limit value between the two operation modes A and B is different from a valve working angle region where there is little difference in the operation quantity between the two operation modes A and B. Thus, when the determination based on the relationship between the valve working angle and the change speed upper limit value of the valve working angle is performed in combination with the determination based on the valve working angle and the operation quantity, the discrepancy between the operation mode of the actuator 2 and the operation mode of the command unit 4 can be detected in all of the valve working angle regions.

Figure 5:
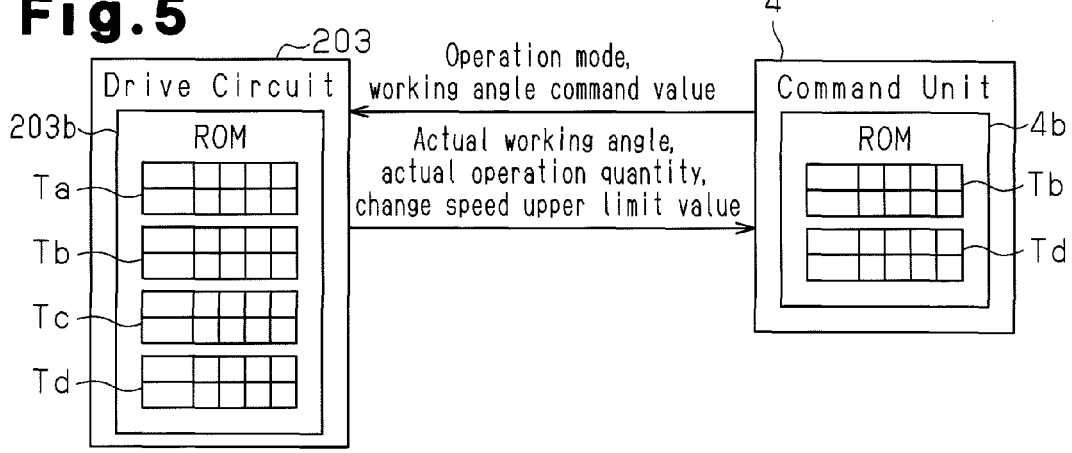
FIG. 5 is a block diagram schematically illustrating a configuration of a control system of a valve working angle variable system according to a second embodiment of the present invention.

FIG. 5 illustrates a configuration for a control system of the valve working angle variable system according to the present embodiment. It is assumed that the control system of FIG. 5 is installed in the valve working angle variable system of the vehicle model B.

As illustrated in FIG. 5, in the present embodiment, the ROM 203b of the drive circuit 203 of the actuator 2 stores reference tables Tc and Td of the valve working angle and the change speed upper limit value for each operation mode as well as the reference tables Ta and Tb of the valve working angle and the operation quantity for each of the applicable operation modes. The reference table Tb of the valve working angle and the operation quantity corresponding to the operation mode (the operation mode B of the vehicle model B) of the applied system and the reference table Td of the valve working angle and the change speed upper limit value corresponding to this operation mode are stored in the ROM 4b of the command unit 4.

Even in the present embodiment, the drive circuit 203 calculates the actual working angle based on the actual operation quantity with reference to the reference table of the valve working angle and the operation quantity used for the calculation of the target operation quantity. In addition, in the present embodiment, the drive circuit 203 calculates the change speed upper limit value with reference to the reference table of the valve working angle and the change speed upper limit value corresponding to the operation mode which is in use, based on the working angle command value received from the command unit 4. The drive circuit 203 transmits the calculated change speed upper limit value as well as the actual working angle and the actual operation quantity to the command unit 4.

Even in the present embodiment, the command unit 4 determines whether or not the actual working angle and the actual operation quantity received from the drive circuit 203 satisfy the relationship of the two values in the reference table Tb of the valve working angle and the operation quantity stored in the command unit 4. In addition, in the present embodiment, the command unit 4 determines whether or not the working angle commanded by the command unit 4 and the change speed upper limit value received from the drive circuit 203 satisfy the relationship of the two values in the reference table Td of the valve working angle and the change speed upper limit value stored in the command unit 4. When a result of at least one of the two determinations is a negative result, the command unit 4 determines that there is the discrepancy between the operation mode of the actuator 2 and the command unit 4.

Figure 6:
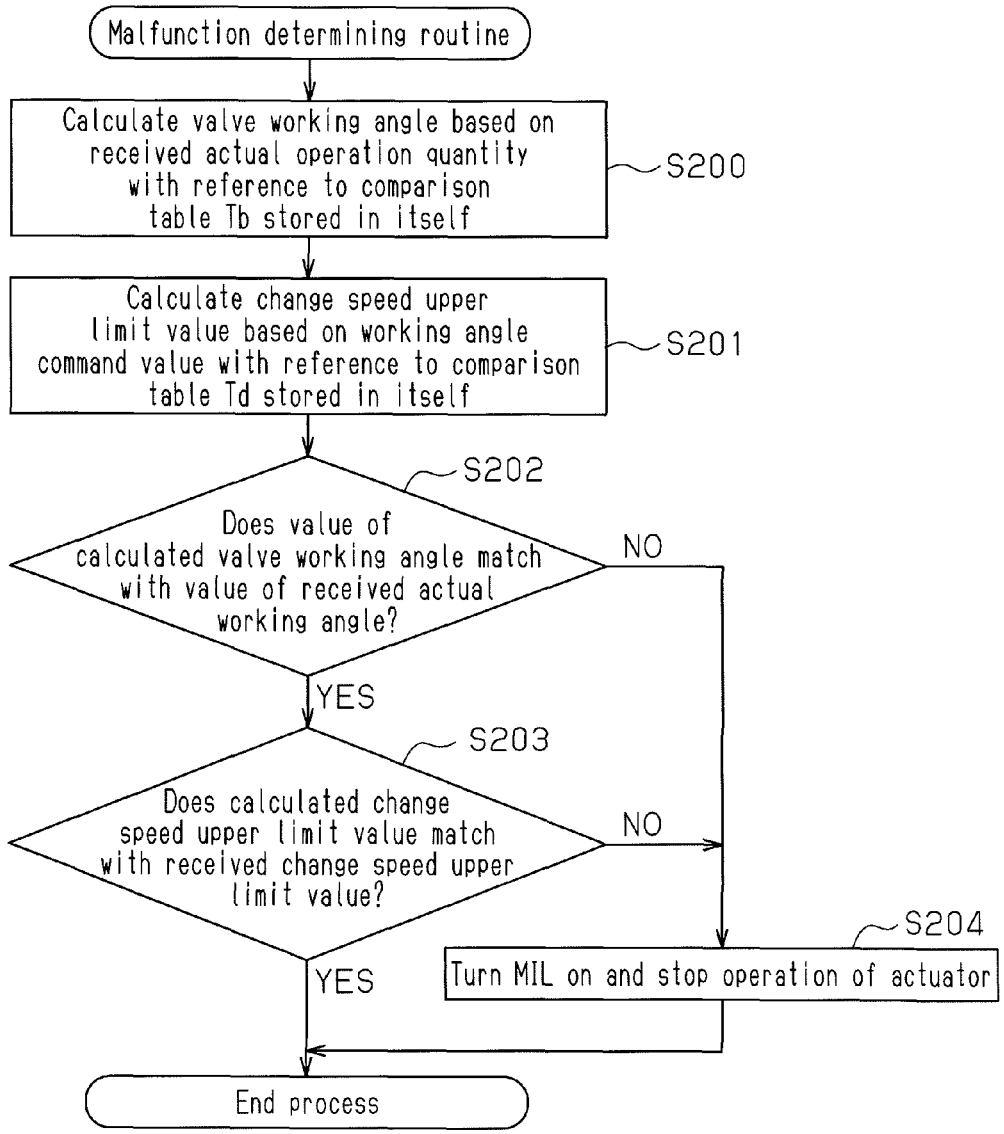
FIG. 6 is a flowchart of a malfunction determining routine employed in the second embodiment.

FIG. 6 illustrates a process procedure of a malfunction determining routine employed in the present embodiment. The process of the present routine is repetitively executed by the command unit 4 each time the actual operation quantity, the actual working angle, and the change speed upper limit value are received from the drive circuit 203.

When the process of the present routine starts, first in step S200, the command unit 4 calculates a value for a valve working angle corresponding to an actual operation quantity received from the drive circuit 203 based on the actual operation quantity, with reference to the reference table Tb of the valve working angle and the operation quantity stored in the command unit 4. Subsequently, in step S201, the command unit 4 calculates a change speed upper limit value corresponding to a working angle command value commanded from the command unit 4 based on the working angle command value with reference to the reference table Td of the valve working angle and the change speed upper limit value stored in the command unit 4.

Then, when the value of the valve working angle calculated by the command unit 4 matches with the value of the actual working angle received from the drive circuit 203 (YES in step S202) and the change speed upper limit value calculated by the command unit 4 matches with the change speed upper limit value received from the drive circuit 203 (YES in step S203), the command unit 4 finishes the process of the present routine. However, when the calculated value of the valve working angle does not match with the value of the received valve working angle (NO in step S202) or when the calculated change speed upper limit value does not match with the received change speed upper limit value (NO in step S203), the command unit 4 shifts the process to step S204. In step S204, the command unit 4 turns an MIL on so as to notify the driver of abnormality and stops an operation of the actuator 2 by power shutdown.

In the above described present embodiment, both the operation quantity and the change speed upper limit value of the valve working angle of the actuator 2 correspond to the parameter correlated to the valve working angle. In the present embodiment, the relationships between the valve working angle and the change speed upper limit value of the valve working angle are stored in the command unit 4 and the actuator 2 as the reference tables Tc and Td, respectively.

According to the above described present embodiment, the following advantage is obtained in addition to the advantage described in (1).

(3) In the present embodiment, the determination based on the relationship between the valve working angle and the change speed upper limit value of the valve working angle is performed in combination with the determination based on the operation quantity and the valve working angle of the actuator 2. For this reason, the valve working angle region in which the discrepancy between the operation modes can be detected increases, and thus the discrepancy between the operation modes can be detected more rapidly and accurately.

Third Embodiment

Next, a third embodiment in which a valve working angle variable system of the present invention is implemented will be described with reference to FIGS. 7 and 8 focusing on the difference with the above embodiments. A control system of a valve working angle variable system of the present embodiment has the same configuration as in the first embodiment illustrated in FIG. 1.

In the first embodiment, the drive circuit 203 of the actuator 2 transmits the actual operation quantity which is the current value of the operation quantity, and the actual working angle calculated based on the actual operation quantity to the command unit 4. The command unit 4 performs the determination on the discrepancy between the operation modes using the received actual working angle and the received actual operation quantity.

Figure 7:
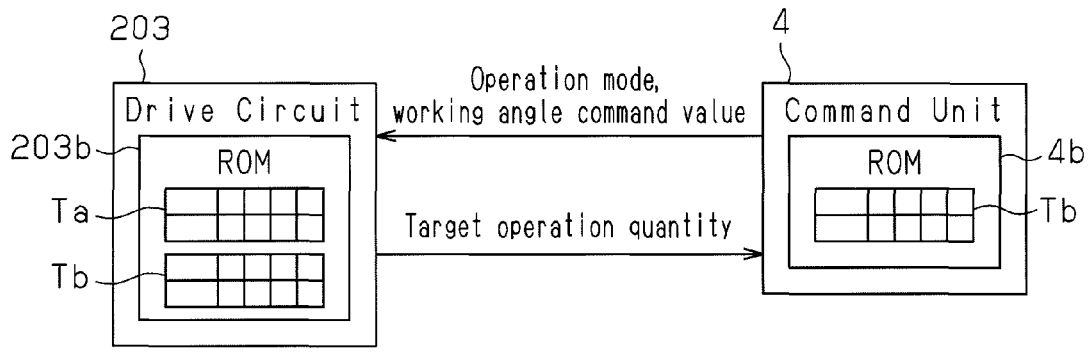
FIG. 7 is a block diagram schematically illustrating a configuration of a control system of a valve working angle variable system according to a third embodiment of the present invention.

On the other hand, in the present embodiment, the drive circuit 203 receives the working angle command value from the command unit 4, and transmits the target operation quantity calculated based on the working angle command value to the command unit 4 as illustrated in FIG. 7. The command unit 4 determines whether or not a relationship between the working angle command value commanded by the command unit 4 and the value of the target operation quantity received from the drive circuit 203 satisfies the relationship between the two values in the reference table Tb of the valve working angle and the operation quantity stored in the command unit 4.

Figure 8:
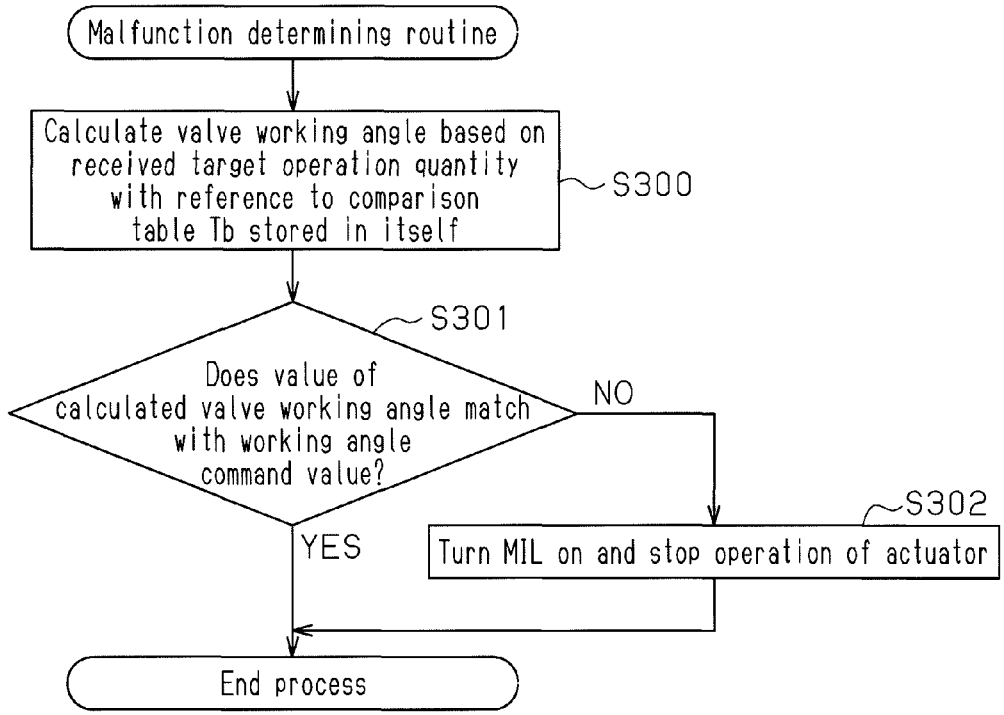
FIG. 8 is a flowchart of a malfunction determining routine employed in the third embodiment.

FIG. 8 illustrates a process procedure of a malfunction determining routine employed in the present embodiment. The process for the present routine is repetitively executed by the command unit 4 each time the target operation quantity is received from the drive circuit 203.

When the present routine starts, in step S300, the command unit 4 calculates a value for a valve working angle corresponding to a value of a target operation quantity received from the drive circuit 203 based on the target operation quantity, with reference to the reference table Tb of the valve working angle and the operation quantity stored in the command unit 4. Subsequently, in step S301, the command unit 4 checks whether or not the calculated value of the valve working angle matches with the working angle command value on which the command unit 4 has previously given to the drive circuit 203. When it is determined that the two values match with each other (YES in step S301), the command unit 4 finishes the process of the present routine of this time. However, when it is determined that the two values do not match with each other (NO in step S301), in step S302, the command unit 4 turns an MIL on so as to notify the driver of an abnormality and stops operation of the actuator 2 by power shutdown.

According to the above described present embodiment, similarly to the first embodiment, it is possible to detect and cope with a malfunction of the actuator 2 which is caused by a discrepancy between the operation mode of the command unit 4 and the operation mode of the actuator 2. In addition, in the present embodiment, since the drive circuit 203 transmits only the target operation quantity to the command unit 4, the amount of data communication between the actuator 2 and the command unit 4 can be reduced.

Fourth Embodiment

Next, a fourth embodiment in which a valve working angle variable system of the present invention is implemented will be described with reference to FIG. 9 focusing on the difference with the above embodiments. A control system of a valve working angle variable system of the present embodiment has the same configuration as in the second embodiment illustrated in FIG. 4.

In the present embodiment, the determination based on the relationship between the valve working angle and the change speed upper limit value of the valve working angle is performed in combination with the determination using the target operation quantity which is the same as in the third embodiment. That is, in the present embodiment, the drive circuit 203 receives the working angle command value from the command unit 4, and calculates the change speed upper limit value based on the working angle command value with reference to the reference table of the valve working angle and the change speed upper limit value corresponding to the operation mode which is in use. The drive circuit 203 transmits the calculated change speed upper limit value and the target operation quantity to the command unit 4.

The command unit 4 calculates the valve working angle corresponding to the target operation quantity received from the drive circuit 203 based on the target operation quantity with reference to the reference table Tb of the valve working angle and the operation quantity stored in the command unit 4, and determines whether or not the calculated value matches with the working angle command value commanded by the command unit 4. Further, the command unit 4 calculates a change speed upper limit value corresponding to the working angle command value commanded by the command unit 4 based on the working angle command value with reference to the reference table Td of the valve working angle and the change speed upper limit value stored in the command unit 4. Then, the command unit 4 determines whether or not the calculated value matches with the change speed upper limit value received from the drive circuit 203.

Figure 9:
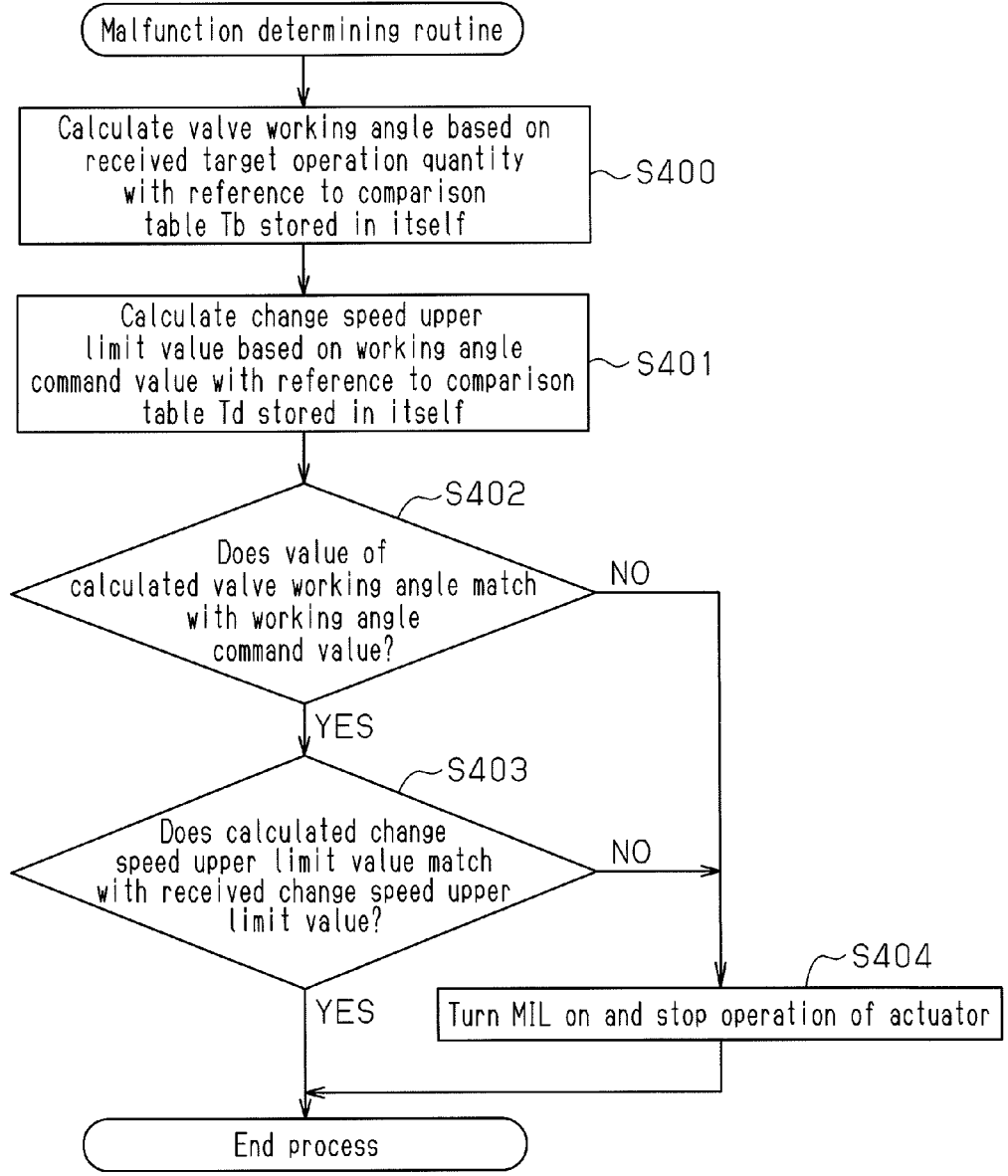
FIG. 9 is a flowchart of a malfunction determining routine employed in a valve working angle variable system according to a fourth embodiment of the present invention.

FIG. 9 illustrates a process procedure for a malfunction determining routine employed in the present embodiment. The process for the present routine is repetitively executed by the command unit 4 each time the target operation quantity and the change speed upper limit value are received from the drive circuit 203.

When the process of the present routine starts, first in step S400, the command unit 4 calculates a value for a valve working angle corresponding to a target operation quantity received from the drive circuit 203 based on the target operation quantity, with reference to the reference table Tb of the valve working angle and the operation quantity stored in the command unit 4. Subsequently, in step S401, the command unit 4 calculates a change speed upper limit value corresponding to a working angle command value previously commanded of the drive circuit 203 based on the working angle command value with reference to the reference table Td of the valve working angle and the change speed upper limit value stored in the command unit 4.

Subsequently, in step S402, the command unit 4 checks whether or not the value of the valve working angle calculated in step S400 matches with the working angle command value commanded of the drive circuit 203. Then, in step S403, the command unit 4 checks whether or not the change speed upper limit value calculated in step S401 matches with the value received from the drive circuit 203.

When the discrepancy between the two values is not detected in any of steps S402 and S403 (YES in step S402 and YES in step S403), the command unit 4 finishes the process of the present routine of this time. However, when the discrepancy between the two values is detected in any of steps S402 and S403 (NO in step S402 or NO in step S403), in step S404, the command unit 4 turns an MIL on so as to notify the driver of an abnormality and stops operation of the actuator 2 by power shutdown.

According to the above described present embodiment, similarly to the second embodiment, the valve working angle region where the discrepancy between the operation modes can be detected increases, and thus the discrepancy between the operation modes can be detected more rapidly and accurately. In addition, in the present embodiment, since the drive circuit 203 transmits only the target operation quantity and the change speed upper limit value, the amount of data communication in which the discrepancy is further reduced can be performed.

Fifth Embodiment

Next, a fifth embodiment in which a valve working angle variable system of the present invention is implemented will be described with reference to FIGS. 10 and 11 focusing on the difference with the above embodiments.

In the above embodiments, the discrepancy between the operation mode of the actuator 2 and the operation mode of the command unit 4 is determined by checking the operation mode which is being used by the actuator 2 is checked based on the operation quantity, the valve working angle, and the change speed upper limit value transmitted from the drive circuit 203 of the actuator 2. However, when the drive circuit 203 transmits information of the operation mode which is in use directly to the command unit 4, the discrepancy between the operation modes can be more simply determined.

Figure 10:
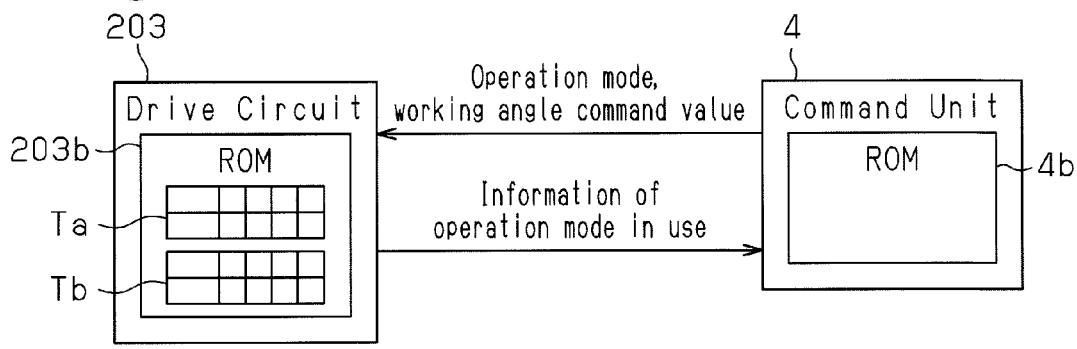
FIG. 10 is a block diagram schematically illustrating a configuration of a control system of a valve working angle variable system according to a fifth embodiment of the present invention.

In this regard, in the present embodiment, the drive circuit 203 transmits information of the operation mode which is currently being used by the drive circuit 203 directly to the command unit 4 as illustrated in FIG. 10. The command unit 4 determines whether or not the received operation mode is supported by the valve working angle variable system in which the command unit 4 is arranged, and checks the discrepancy between the operation modes through this determination. An identification code of an operation mode, an identification code of a valve working angle variable system corresponding to an operation mode, an identification code of a reference table used in an operation mode, and the like may be used as the information of the operation mode which is used for the notification or determination.

Figure 11:
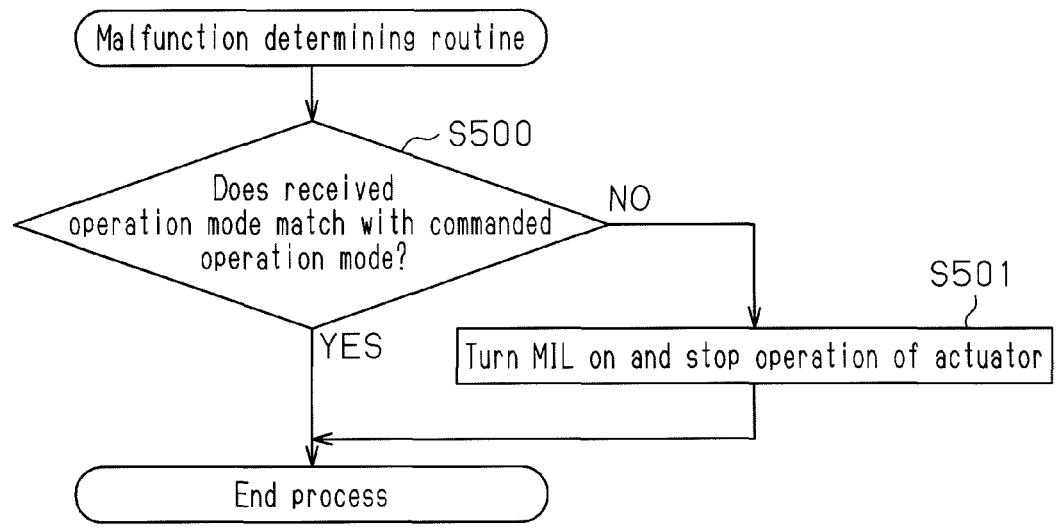
FIG. 11 is a flowchart of a malfunction determining routine employed in the fifth embodiment.
Figure 12:
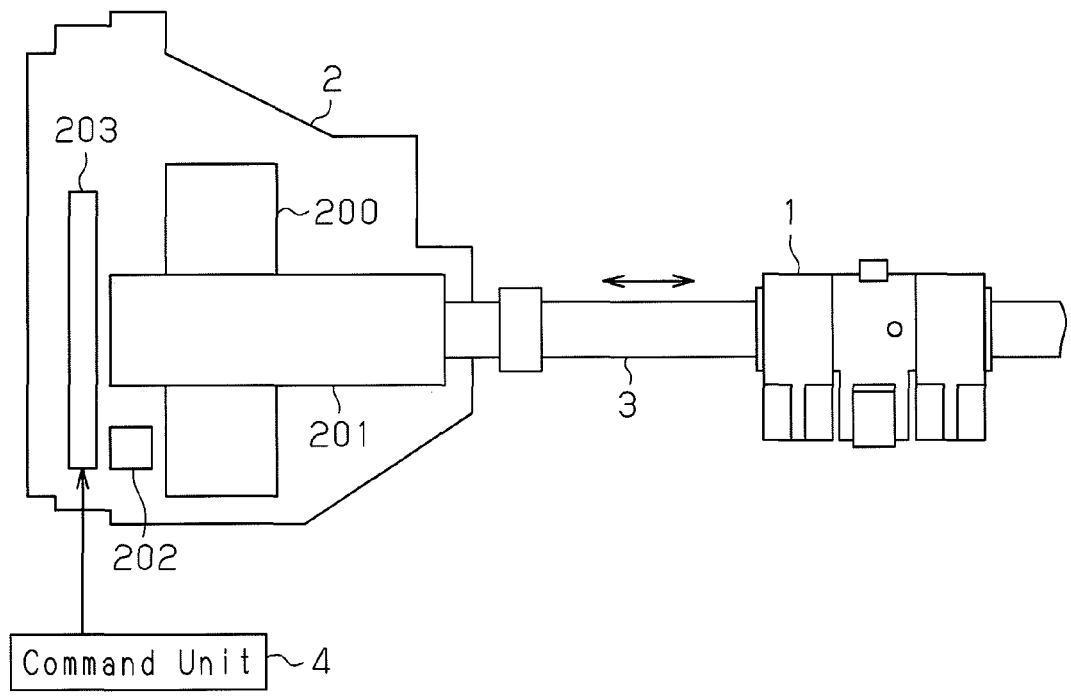
FIG. 12 is a schematic diagram schematically illustrating an overall structure of an example of a conventional valve working angle variable system.
Figure 13:
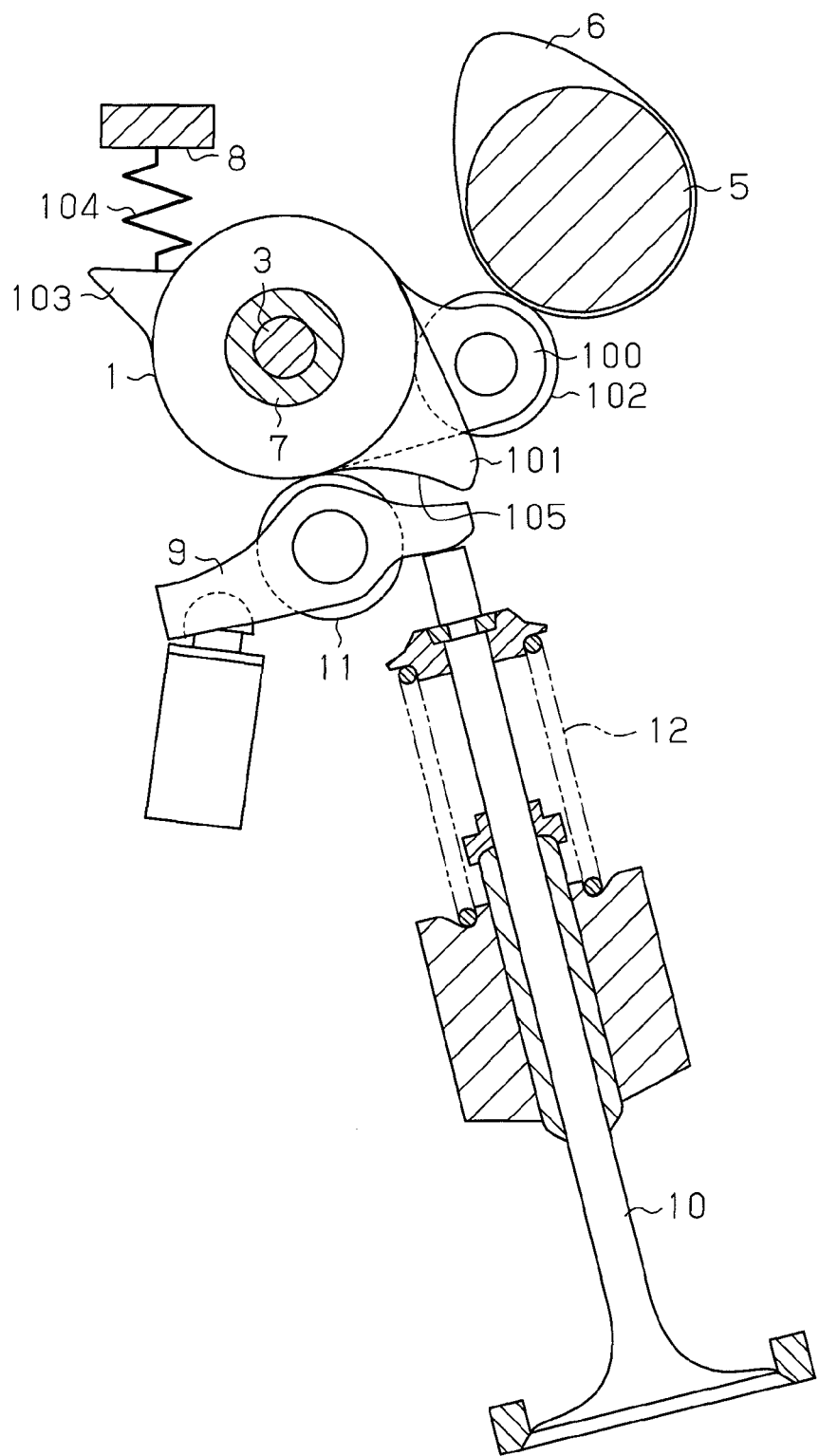
FIG. 13 is a cross-sectional view illustrating a configuration of a valve train of an internal combustion engine to which the conventional valve working angle variable system is applied.
Figure 14:
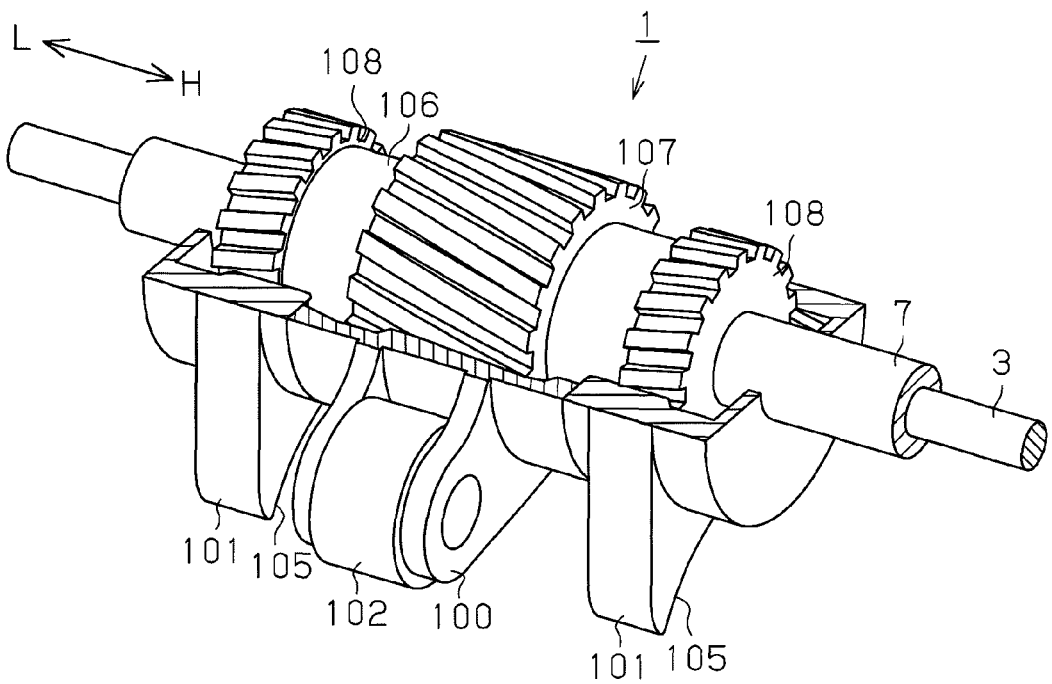
FIG. 14 is a cross-sectional view illustrating a perspective cross-sectional structure of the conventional valve working angle variable mechanism.
Figure 15:
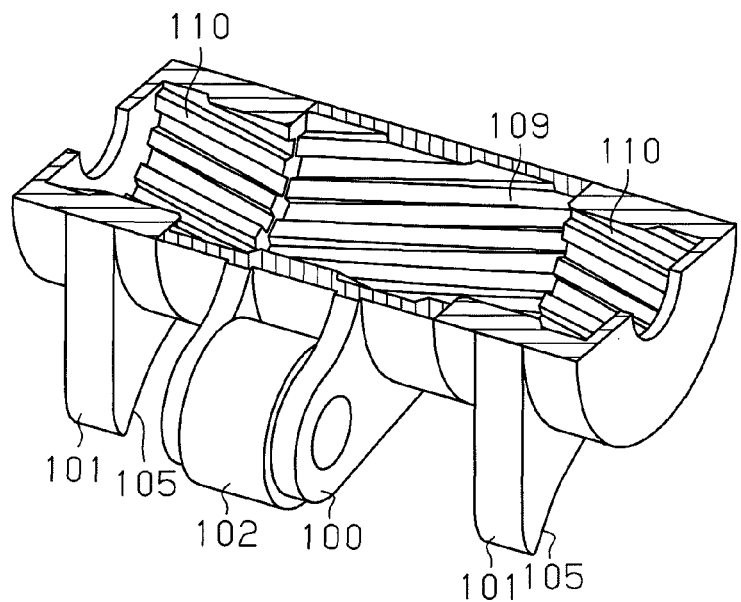
FIG. 15 is a cross-sectional view illustrating a perspective cross-sectional structure of the conventional valve working angle variable mechanism.

FIG. 11 illustrates a process procedure for a malfunction determining routine employed in the present embodiment. The process for the present routine is repetitively executed by the command unit 4 in response to the information of the operation mode from the drive circuit 203.

When the present routine starts, first in step S500, the command unit 4 checks whether or not the operation mode notified from the drive circuit 203 matches with the operation mode commanded from the drive circuit 203, that is, the operation mode corresponding to the valve working angle variable system in which the command unit 4 is installed. When the two operation modes match with each other (YES in step S500), the command unit 4 finishes the process of the present routine. However, when the two operation modes do not match with each other (NO in step S500), in step S501, the command unit 4 turns an MIL on so as to notify the driver of an abnormality and stops operation of the actuator 2 by power shutdown.

According to the above described present embodiment, it is possible to detect and cope with a malfunction of the actuator 2 which is caused by the discrepancy between the operation mode of the command unit 4 and the operation mode of the actuator 2.

The above described embodiments may be modified as follows.

In the first and second embodiments, the command unit 4 performs the determination each time the actual working angle, the actual operation quantity, and the like are received from the drive circuit 203. Further, in the third and fourth embodiments, the command unit 4 performs the determination each time the target operation quantity and the like are transmitted from the drive circuit 203 in response to each command given on the valve working angle. When the calculation load of the command unit 4 for the determination is desired to reduce, the determination may be performed each time reception is performed a predetermined number of times, or the determination may be performed once a predetermined time.

In the first embodiment, the command unit 4 calculates the valve working angle based on the actual operation quantity received from the drive circuit 203, and determines whether or not the calculated value matches with the actual working angle received from the drive circuit 203. However, the same determination can be performed even by calculating the operation quantity based on the actual working angle received from the drive circuit 203 and checking whether or not the calculated value matches with the value of the actual operation quantity received from the drive circuit 203.

In the second and fourth embodiments, the command unit 4 performs the determination by calculating the change speed upper limit value based on the working angle command value commanded of the drive circuit 203 and checking whether or not the calculated value matches with the change speed upper limit value received from the drive circuit 203. However, the same determination can be performed even by calculating the valve working angle based on the change speed upper limit value received from the drive circuit 203, and checking whether or not the calculated value matches with the working angle command value sent to the drive circuit 203.

In the third and fourth embodiments, the command unit 4 performs the determination by calculating the valve working angle based on the target operation quantity received from the drive circuit 203 and checking whether or not the calculated value matches with the working angle command value commanded of the drive circuit 203. However, the same determination can be performed even by calculating the operation quantity of the actuator 2 based on the working angle command commanded of the drive circuit 203 and checking whether or not the calculated value matches with the value of the target operation quantity received from the drive circuit 203.

In the first embodiment, the command unit 4 determines the discrepancy between the operation modes based on the actual working angle and the actual operation quantity received from the drive circuit 203. However, the determination on the discrepancy between the operation modes by the command unit 4 can be performed based on any valve working angle or any operation quantity which the drive circuits 203 has calculated using the reference table used for the calculation of the target operation quantity, and any operation quantity or any valve working angle which has been used for the calculation. For example, the drive circuit 203 calculates an operation quantity or a valve working angle based on a valve working angle or an operation quantity which is randomly decided with reference to the reference table used for the calculation of the target operation quantity, and transmits the calculated operation quantity or the calculated valve working angle, and the valve working angle or the operation quantity used for the calculation to the command unit 4. The command unit 4 can perform the determination on the discrepancy between the operation modes by determining whether or not the received valve working angle or the received operation quantity satisfies the relationship between the two values in the reference table Tb of the valve working angle and the operation quantity stored in the command unit 4.

In the second and fourth embodiments, the drive circuit 203 calculates the change speed upper limit value based on the working angle command value. The command unit 4 performs the determination on the discrepancy between the operation modes based on the change speed upper limit value calculated by the drive circuit 203 and the working angle command value. However, the determination on the discrepancy between the operation modes by the command unit 4 may be performed based on any valve working angle or the change speed upper limit value which the drive circuit 203 has calculated using the reference table corresponding to the operation mode which is in use, and any change speed upper limit value or any valve working angle which has been used for the calculation. For example, the determination on the discrepancy between the operation modes can be performed using the actual working angle calculated based on the actual operation quantity and the change speed upper limit value calculated based on the actual working angle. Further, the drive circuit 203 may calculate a change speed upper limit value or a valve working angle based on a valve working angle or a change speed upper limit value which is randomly decided with reference to the reference table of the valve working angle and the change speed upper limit value corresponding to the operation mode which is in use, and transmit the calculated value and the value used for the calculation to the command unit 4. The command unit 4 may perform the determination on the discrepancy between the operation modes by determining whether or not the received valve working angle or the received change speed upper limit value satisfies the relationship between the two values in the reference table Td of the valve working angle and the change speed upper limit value stored in the command unit 4.

In the above embodiments, the drive circuit 203 and the command unit 4 store the relationship between the valve working angle and the operation quantity and the relationship between the valve working angle and the change speed upper limit value as the reference tables. However, the relationships may be stored as a relational expression of the valve working angle and the operation quantity and a relational expression of the valve working angle and the change speed upper limit value.

In the above embodiments, the command unit 4 performs the determination on the discrepancy between the operation modes based on the relationship between the valve working angle and the operation quantity and the relationship between the valve working angle and the change speed upper limit value. However, the same determination may be performed based on a relationship between the valve working angle and other parameters. That is, any parameter that changes according to the valve working angle is unambiguously determined, and a relationship between the parameter and the valve working angle changes according to a change in the relationship between the valve working angle and the operation quantity of the actuator can be used for the determination. For example, a time, power, or a rotational angle of the motor 200, which is necessary for changing the valve working angle by a unit quantity, a load of the motor 200 necessary for changing the valve working angle, or the like may be used as the parameter.

The above embodiments have been described in connection with the example in which the present invention is applied to a valve working angle variable system configured to vary the valve working angle by directly operating the control shaft 3 through the actuator 2. However, the present invention can be applied to a valve working angle variable system having any other configuration. For example, the present invention can be applied to a valve working angle variable system configured to vary the valve working angle by changing the rotational angle of the control shaft through the actuator. In this case, the rotational angle of the control shaft is used as the operation quantity of the actuator.

In the above embodiments, the detection of the discrepancy between the operation mode of the actuator 2 and the operation mode of the command unit 4 is coped with by turning the MIL on and stopping operation of the actuator 2. However, the detection of the discrepancy between the operation modes may be coped with by restricting a control range of the valve working angle to a range in which valve stamping can be reliably avoided regardless of the operation mode in which the actuator 2 is operating. Further, in an internal combustion engine in which the valve working angle variable system and the valve timing variable system are installed together, the detection of the discrepancy between the operation mode may be coped with by restricting a control range of valve timing to a range in which valve stamping can be reliably avoided regardless of the operation mode in which the actuator 2 is operating.

DESCRIPTION OF THE REFERENCE NUMERALS

1 . . . Valve Working Angle Variable Mechanism (100 . . . Input Arm, 101 . . . Output Arm, 102 . . . Roller, 103 . . . Projection, 104 . . . Lost Motion Spring, 105 . . . Cam Surface, 106 . . . , 107 . . . Input Gear, 108 . . . Gear, 109 . . . Internal Toothed Gear, And . . . 110 Internal Toothed Gear)

2 . . . Actuator (200 . . . Motor, 201 . . . Conversion Mechanism, 202 . . . Rotational Angle Sensor, 203 . . . Drive Circuit (203$a$ . . . CPU, 203$b$ . . . ROM, 203$c$ . . . RAM, 203$d$ I/O))

3 . . . Control Shaft

4 . . . Command Unit (4$a$ CPU, 4$b$ ROM, 4$c$ RAM, 4$d$ I/O)

5 . . . Cam Shaft

6 . . . Cam

7 . . . Rocker Shaft
8 . . . Spring Seat
9 . . . Roller Rocker Arm
10 . . . Engine Valve
11 . . . Roller
12 . . . Valve Spring
13 . . . Controller Area Network (CAN)

The invention claimed is:

1. A valve working angle variable system, comprising:
a command unit; and
an actuator including a first memory circuit configured to store a relationship between a valve working angle and an operation quantity of the actuator and a first processor circuit configured to calculate the operation quantity of the actuator necessary for achieving the valve working angle commanded by the command unit based on the relationship between the valve working angle and the operation quantity stored in the first memory circuit of the actuator, the first processor circuit of the actuator is configured to adjust the valve working angle according to the valve working angle commanded by the command unit by adjusting the actual operation quantity according to the calculated operation quantity, wherein
the command unit includes a second processor circuit configured to give the actuator a command for an operation mode and a second memory circuit configured to store a relationship between the valve working angle and a parameter correlated to this valve working angle for the commanded operation mode,
the parameter is any parameter that changes according to the valve working angle and is unambiguously determined, and the relationship between the parameter and the valve working angle that changes according to a change in the relationship between the valve working angle and the operation quantity of the actuator is used for the determination,
the first processor circuit of the actuator is configured to obtain an actual value of the parameter based on a detection value, and obtain a current value of the valve working angle based on the actual value of the parameter with reference to the relationship corresponding to the commanded operation mode,
the first processor circuit of the actuator is configured to transmit the actual value of the parameter and the current value of the valve working angle to the command unit, and the second processor circuit of the command unit is configured to determine an abnormality comprising a discrepancy between the operation mode of the command unit and the operation mode of the actuator based on whether or not the transmitted two values match the relationship between the two values stored in the second memory circuit of the command unit,
when a negative result is determined, the command unit is configured to perform at least one of notification of abnormality and stopping operation of the actuator is performed,
wherein the actuator is operable in a plurality of operation modes that differ in the relationship between the valve working angle and the operation quantity of the actuator, and wherein
the second processor circuit of the command unit is configured to give the first processor circuit of the actuator the command for the operation mode to change the operation mode of the actuator,
wherein the actuator is configured to support a plurality of the valve working angle ranges,
wherein the first memory circuit of the actuator is configured to store a plurality of tables and/or relational expressions of the relationship between the valve working angle and the operation quantity of the actuator corresponding to the plurality of the operation modes in advance,
wherein the valve working angle range differs according to a specification of a vehicle model to which the valve working angle variable system is applied, the actuator is applicable to both of a first vehicle model and a second vehicle model, the first processor circuit of the actuator is configured to calculate a target operation quantity of the first vehicle model using the table and/or relational expressions for the first vehicle model and to calculate a target operation quantity of the second vehicle model using the table and/or relational expressions for the second vehicle model.

2. The valve working angle variable system according to claim 1, wherein the actuator and the command unit are configured to use the operation quantity as the parameter.

3. The valve working angle variable system according to claim 1, wherein the actuator and the command unit are configured to use an upper limit value of the operation quantity of the valve working angle as the parameter.

4. The valve working angle variable system according to claim 1,
wherein the second processor circuit of the command unit performs the determination by calculating one of the value of the valve working angle and the value of the parameter received from the actuator using the other of the values based on the relationship between the two values stored in the command unit, and checking whether or not the calculated value matches with the received value.

5. A valve working angle variable system, comprising:
a command unit; and
an actuator including a first memory circuit configured to store a relationship between a valve working angle and an operation quantity of the actuator and a first processor circuit configured to calculate the operation quantity of the actuator necessary for achieving the valve working angle commanded by the command unit based on the relationship between the valve working angle and the operation quantity stored in the first memory circuit of the actuator, the first processor circuit of the actuator is configured to adjust the valve working angle according to the valve working angle commanded by the command unit by adjusting the actual operation quantity according to the calculated operation quantity, wherein
the command unit including a second processor circuit configured to give the actuator a command for an operation mode and a second memory circuit configured to store a relationship between the valve working angle and the operation quantity for the commanded operation mode,
the first processor circuit of the actuator is configured to obtain an actual value of the operation quantity based on a detection value, and calculate a current value of the valve working angle using the actual value of the operation quantity based on the relationship stored in the actuator corresponding to the commanded operation mode, and is configured to transmit the value of the operation quantity used for the calculation and the calculated value of the valve working angle to the command unit, the second processor circuit of the command unit is configured to determine an abnormality comprising a discrepancy between the operation mode of the command unit and the operation mode of the actuator based on whether or not the values of the valve working angle and the operation quantity received from the actuator match the relationship between the two values stored in the command unit, and when a negative result is determined, the command unit is configured to perform at least one of notification of abnormality and stopping operation of the actuator is performed, wherein the actuator is operable in a plurality of operation modes that differ in the relationship between the valve working angle and the operation quantity of the actuator, and wherein the second processor circuit of the command unit is configured to give the first processor circuit of the actuator the command for the operation mode to change the operation mode of the actuator, wherein the actuator is configured to support a plurality of valve working angle ranges, wherein the first memory circuit of the actuator is configured to store a plurality of tables and/or relational expressions of the relationship between the valve working angle and the operation quantity of the actuator corresponding to the plurality of the operation modes in advance, wherein the valve working angle range differs according to a specification of a vehicle model to which the valve working angle variable system is applied, the actuator is applicable to both of a first vehicle model and a second vehicle model, the first processor circuit of the actuator is configured to calculate a target operation quantity of the first vehicle model using the table and/or relational expressions for the first vehicle model and to calculate a target operation quantity of the second vehicle model using the table and/or relational expressions for the second vehicle model.

6. The valve working angle variable system according to claim 5, wherein the second memory circuit of the command unit is configured to store a relationship between the valve working angle and an upper limit value of the operation quantity of this valve working angle for an operation mode commanded of the actuator, the first memory circuit of the actuator is configured to store a relationship between the valve working angle and the upper limit value of the operation quantity for an operation mode used by the actuator, the first processor circuit of the actuator is configured to calculate the upper limit value using the value of the valve working angle based on the relationship between the two values stored in the first memory circuit of the actuator, and transmit the two values to the command unit, and the second processor circuit of the command unit is configured to determine whether or not the value of the valve working angle and the upper limit value received from the actuator match the relationship between the two values stored in the second memory circuit of the command unit.

7. The valve working angle variable system according to claim 5, wherein the second processor circuit of the command unit is configured to determine the negative result by calculating one of the value of the valve working angle and the value of the operation quantity received from the actuator using the other of the values based on the relationship between the two values stored in the second memory circuit of the command unit, and check whether or not the calculated value matches with the received value.

8. A valve working angle variable system, comprising:

a command unit; and an actuator including a first memory circuit configured to store a relationship between a valve working angle and an operation quantity of the actuator and a first processor circuit configured to calculate the operation quantity of the actuator necessary for achieving the valve working angle commanded by the command unit based on the relationship between the valve working angle and the operation quantity stored in the first memory circuit of the actuator, the first processor circuit of the actuator is configured to adjust the valve working angle according to the valve working angle commanded by the command unit by adjusting the actual operation quantity according to the calculated operation quantity, wherein the command unit including a second processor circuit configured to give the actuator a command for an operation mode and a second memory circuit configured to store a relationship between the valve working angle and the operation quantity for the commanded operation mode, the first processor circuit of the actuator is configured to calculate a value of the operation quantity using a value of the commanded valve working angle based on the relationship stored in the first memory circuit of the actuator, and transmit the calculated value of the operation quantity to the command unit, the second processor circuit of the command unit is configured to calculate a value of the operation quantity using the value of the valve working angle commanded of the actuator based on the relationship between the two values stored in the second memory circuit of the command unit, and determine an abnormality comprising a discrepancy between the operation mode of the command unit and the operation mode of the actuator based on whether or not the calculated value of the operation quantity matches with the value of the operation quantity received from the actuator, and when a negative result is determined, the command unit is configured to perform at least one of notification of abnormality and operation stop of the actuator is performed, wherein the actuator is operable in a plurality of operation modes that differ in the relationship between the valve working angle and the operation quantity of the actuator, and wherein the second processor circuit of the command unit is configured to give the first processor circuit of the actuator the command for the operation mode to change the operation mode of the actuator, wherein the actuator is configured to support a plurality of valve working angle ranges, wherein the first memory circuit of the actuator is configured to store a plurality of tables and/or relational expressions of the relationship between the valve working angle and the operation quantity of the actuator corresponding to the plurality of the operation modes in advance, wherein the valve working angle range differs according to a specification of a vehicle model to which the valve working angle variable system is applied, the actuator is applicable to both of a first vehicle model and a second vehicle model, the first processor circuit of the actuator is configured to calculate a target operation quantity of the first vehicle model using the table and/or relational expressions for the first vehicle model and to calculate a target operation quantity of the second vehicle model using the table and/or relational expressions for the second vehicle model.

9. The valve working angle variable system according to claim 8, wherein
the second memory circuit of the command unit is configured to store a relationship between the valve working angle and an upper limit value of the operation quantity of this valve working angle for the operation mode commanded of the actuator,
the first memory circuit of the actuator is configured to store a relationship between the valve working angle and the upper limit value for the operation mode used by the actuator,
the first processor circuit of the actuator is configured to calculate the upper limit value using the value of the valve working angle commanded from the command unit based on the relationship between the two values stored in the first memory circuit of the actuator, and transmit the calculated value to the command unit, and
the second processor circuit of the command unit is configured to calculate the upper limit value using a value of the valve working angle commanded of the actuator based on the relationship between the two values stored in the second memory circuit of the command unit, and determine whether or not the calculated value matches with the change speed upper limit value received from the actuator.

10. A valve working angle variable system, comprising:
a command unit; and
an actuator including a first memory circuit configured to store a relationship between a valve working angle and an operation quantity of the actuator and a first processor circuit configured to calculate the operation quantity necessary for achieving the valve working angle commanded by the command unit based on the relationship between the valve working angle and the operation quantity stored in the first memory circuit of the actuator, the first processor circuit of the actuator is configured to adjust the valve working angle according to the valve working angle commanded by the command unit by adjusting an actual operation quantity according to a calculated operation quantity, wherein
the command unit including a second processor circuit configured to give the actuator a command for an operation mode and a second memory circuit configured to store a relationship between the valve working angle and the operation quantity,
the first processor circuit of the actuator is configured to transmit an operation mode set according to the command to the command unit,
the second processor circuit of the command unit is configured to determine an abnormality comprising a discrepancy between the operation mode of the command unit and the operation mode of the actuator based on whether or not the operation mode received from the actuator matches with the operation mode commanded of this actuator, and
when a negative result is determined, the command unit is configured to perform at least one of notification of abnormality and stopping operation of the actuator is performed,
wherein the actuator is operable in a plurality of operation modes that differ in the relationship between the valve working angle and the operation quantity of the actuator, and wherein
the second processor circuit of the command unit is configured to give the first processor circuit of the actuator the command for the operation mode to change the operation mode of the actuator,
wherein the actuator is configured to support a plurality of valve working angle ranges,
wherein the first memory circuit of the actuator is configured to store a plurality of tables and/or relational expressions of the relationship between the valve working angle and the operation quantity of the actuator corresponding to the plurality of the operation modes in advance,
wherein the valve working angle range differs according to a specification of a vehicle model to which the valve working angle variable system is applied, the actuator is applicable to both of a first vehicle model and a second vehicle model, the first processor circuit of the actuator is configured to calculate a target operation quantity of the first vehicle model using the table and/or relational expressions for the first vehicle model and to calculate a target operation quantity of the second vehicle model using the table and/or relational expressions for the second vehicle model.

* * * * *